United States Patent
Ramanathan et al.

(10) Patent No.: US 12,237,868 B2
(45) Date of Patent: Feb. 25, 2025

(54) SERVICE AND POWER CONTROL ORCHESTRATOR

(71) Applicant: Infinera Corp., San Jose, CA (US)

(72) Inventors: Baranidhar Ramanathan, Karnataka (IN); Ashok Kunjidhapatham, Devarachikkanahalli (IN); Sanjeev Ramachandran, Karnataka (IN); Jonathan Buset, San Jose, CA (US); Nikhil Satyarthi, Yelahanka (IN); Bhupathi Rao Yellinedi, Bangalore (IN); Badareenath Alur Sreenivasacharya, Bangalore (IN); Anil Naduvile Veedu, Kannur (IN); Aryabhata Deshpande, Bommanahalli (IN); Servesh Singh, Bangalore (IN); Dinesh Kumar Parkasam, Madurai (IN)

(73) Assignee: Infinera Corporation, San Jose, CA (US)

( * ) Notice: Subject to any disclaimer, the term of this patent is extended or adjusted under 35 U.S.C. 154(b) by 204 days.

(21) Appl. No.: 18/163,636

(22) Filed: Feb. 2, 2023

(65) Prior Publication Data
US 2023/0261749 A1 Aug. 17, 2023

Related U.S. Application Data

(60) Provisional application No. 63/305,779, filed on Feb. 2, 2022.

(51) Int. Cl.
H04B 10/27 (2013.01)
H04B 10/294 (2013.01)
H04J 14/02 (2006.01)

(52) U.S. Cl.
CPC ......... H04B 10/271 (2013.01); H04B 10/294 (2013.01); H04J 14/0221 (2013.01)

(58) Field of Classification Search
None
See application file for complete search history.

(56) References Cited

U.S. PATENT DOCUMENTS 8,774,632 B2 * 7/2014 Archambault .... H04J 14/02122
398/43
9,479,282 B2 * 10/2016 Jinno .................. H04J 14/0238
(Continued)

Primary Examiner — Jai M Lee

(57) ABSTRACT

Networks and network elements having a service and power control orchestrator are disclosed, including a network element comprising a processor; a first port coupled to a first optical link carrying a first optical signal; a WSS having a multiplexer, a demultiplexer, and a control block operable to control the multiplexer/demultiplexer. The WSS operable to switch the first optical signal into a second optical signal. A second port is coupled to a second optical link, operable to carry the second optical signal, and in optical communication with the WSS. A memory stores an orchestrator application, an OTSA component, a service component, and instructions that cause the processor to: store a logical ROADM model having a connectivity matrix of the network element; receive a communication associated with the control block based on the logical ROADM model; and transmit, to the control block, a service loading sequence based on the logical ROADM model.

20 Claims, 6 Drawing Sheets

(56) References Cited

U.S. PATENT DOCUMENTS

| | | | | |
|---|---|---|---|---|
| 9,654,852 B2* | 5/2017 | Yin | .................... | H04J 14/0205 |
| 10,727,936 B2* | 7/2020 | Yilmaz | ................. | H04J 3/1652 |
| 10,797,824 B2* | 10/2020 | Rao | ................... | H04Q 11/0001 |
| 11,165,529 B2* | 11/2021 | Yamamoto | ......... | H04Q 11/0005 |
| 11,212,599 B2* | 12/2021 | Satyarthi | ............. | H04J 14/0227 |
| 11,251,894 B2* | 2/2022 | Bravi | ................... | H04B 10/506 |
| 2008/0298805 A1* | 12/2008 | Lee | ........................ | H04L 45/50 |
| | | | | 398/48 |
| 2018/0109349 A1* | 4/2018 | Honda | .................. | H04B 10/29 |
| 2018/0359029 A1* | 12/2018 | Shiner | ................ | H04B 10/0795 |

* cited by examiner

SERVICE AND POWER CONTROL ORCHESTRATOR

CROSS-REFERENCE TO RELATED APPLICATION

This application claims priority to U.S. Provisional Patent Application No. 63/305,779, filed Feb. 2, 2022, the entire content of which is incorporated herein by reference in its entirety.

DESCRIPTION OF THE PRIOR ART

Optical networking is a communication means that utilizes signals encoded in light to transmit information, e.g., data, as an optical signal in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wavelength division multiplexing to enable high-bandwidth communication.

Optical networks are a critical component of the global Internet backbone. This infrastructure acts as the underlay, providing the plumbing for all other communications to take place (e.g., access, metro, and long-haul). In the traditional 7-layer OSI model, Optical networks constitute the Layer 1 functions, providing digital transmission of bit streams transparently across varying distances over a chosen physical media (in this case, optical). Optical networks also encompass an entire class of devices (which are referred to as Layer 0), which purely deal with optical photonic transmission and wavelength division multiplexing (WDM). This includes amplification, (re-)generation, and optical add/drop multiplexing (OADM). The most widely adopted Layer 1/Layer 0 transport networking technologies today, referred to as Optical Transport Networks (OTN), are based on ITU-T standards. Both these classes of networks are connection-oriented and circuit-switched in nature.

Dense Wavelength Division Multiplexing (DWDM) is an optical transmission technology that uses a single fiber optic line to simultaneously transport multiple optical services of different wavelengths. The different wavelengths are conventionally separated into several frequency bands, each frequency band being used as an independent channel to transport optical services of particular wavelengths. The Conventional Band (C-band) typically includes signals with wavelengths ranging from 1530 nm to 1565 nm, is the frequency band in which optical services experience the lowest amount of loss, and is the band most commonly used in DWDM. The Long-wavelength Band (L-band), which typically includes signals with wavelengths ranging from 1565 nm to 1625 nm, is the frequency band in which optical services experience the second lowest amount of loss, and is the frequency band often used when the C-band is insufficient to meet bandwidth requirements. Optical line systems that use both the C-band and the L-band are referred to as C+L or C/L optical line systems C+L optical line systems may be susceptible to experiencing optical power transients during loading operations due to the Stimulated Raman Scattering (SRS) effect across the different frequency bands. This can lead to traffic drop on pre-existing services in one frequency band if there is a significant loading change in the other frequency band.

SUMMARY OF THE INVENTION

In C+L-band networks, services in a particular band (i.e., the C-band or the L-band) should be carefully loaded to minimize the effects of optical power changes on pre-existing services in the other band. This is due to the SRS effect. In C-band networks, services in a particular part of the spectrum may be loaded independently and without consideration for pre-existing services in another part of the spectrum. However, Optical power control functionality for C+L Band requires orchestration and network-wide coordination to avoid transients and SRS tilt implications. In order to accomplish this, Service and Power Control Orchestrator (SPCO) is used.

In one implementation, the problems of mitigating or limiting transients and the SRS effect when loading services in a C+L band optical network is solved by orchestration and network-wide coordination of optical power control functionality as addressed by a network element as disclosed herein. The network element may comprise a first line port, a wavelength selective switch, a second line port, a processor, and a memory. The first line port may be optically coupled to a first optical fiber link carrying a first optical signal having a first plurality of passbands. The wavelength selective switch may be in optical communication with the first line port and may include a multiplexer, a demultiplexer, and one or more control block. The wavelength selective switch may be operable to selectively switch the first optical signal into a second optical signal having a second plurality of passbands. The one or more control block may be operable to control the multiplexer or the demultiplexer. The second line port may be optically coupled to a second optical fiber link and may be operable to carry the second optical signal. The second line port may be in optical communication with the wavelength selective switch.

The memory may comprise a non-transitory processor-readable medium storing an orchestrator application, an optical topology and switching abstraction component, one or more service components, and processor-executable instructions. The processor-executable instructions, when executed by the processor, may cause the processor to: store, by the optical topology and switching abstraction component, a logical ROADM model of the network element where the logical ROADM model includes a connectivity matrix associating a cross-connection between a first logical line port associated with the first line port and a second logical line port associated with the second line port; receive, by the orchestrator application, a communication from the one or more service component where the communication is associated with the one or more control block based on the logical ROADM model; and transmit, to the one or more control block of the wavelength selective switch, one or more service loading sequence based on the logical ROADM model and the communication to cause the wavelength selective switch to control the multiplexer via multiplexer WSS controls or to control the demultiplexer via demultiplexer WSS controls.

In another implementation, the problems of mitigating or limiting transients and the SRS effect when loading services in a C+L band optical network is solved by orchestration and network-wide coordination of optical power control functionality as addressed by a network element as disclosed herein. The network element may comprise a first FRM, a second FRM, a node processor, and a node memory. The first FRM may comprise a first system port; a second system port; a first line port that is optically coupled to a first optical fiber link carrying a first optical signal having a first group of passbands; a first processor; and a first memory comprising a non-transitory processor-readable medium storing first processor-executable instructions. The second FRM may comprise a third system port; a fourth system port; a second line port optically coupled to the first FRM; a second processor; and a second memory comprising a non-transitory processor-readable medium storing second processor-executable instructions.

The node memory may comprise a non-transitory processor-readable medium storing an orchestrator application, an optical topology and switching abstraction component, and storing processor-executable instructions that when executed by the node processor may cause the node processor to: store, by the optical topology and switching abstraction component in the node memory, a first logical FRM model of the first FRM, the first logical FRM model associating the first system port to a first logical system port, the second system port to a second logical system port, the first line port to a first logical line port, and a first logical connection between the first logical system port and the first logical line port; store, by the optical topology and switching abstraction component, a second logical FRM model of the second FRM, the second logical FRM model associating the third system port to a third logical system port, the fourth system port to a fourth logical system port, the second line port to a second logical line port, and a second logical connection between the first logical system port and the first logical line port; transmit, by the orchestrator application, a first request to the first FRM, the first request comprising one of an activation or a deactivation of a first group of passbands of the first optical signal based on a first particular logical system port; and transmit, by the orchestrator application, a second request to the second FRM, the second request comprising one of an activation or a deactivation of a second group of passbands of the first optical signal based on a second particular logical system port.

The first processor-executable instructions, when executed by the first processor, may cause the first processor to: receive, by a first control block, the first request from the orchestrator application; and responsive to the first request, activate or deactivate one or more of the first group of passbands based on the first particular logical system port of the first request, each first passband of the first group of passbands being associated with one of the first system port and second system port.

The second processor-executable instructions, when executed by the second processor may cause the second processor to: receive, by a second control block, the second request from the orchestrator application; and responsive to the second request, activate or deactivate one or more of the second group of passbands based on the second particular logical system port of the second request, each second passband being associated with one of the third system port and fourth system port.

In another implementation, the problems of mitigating or limiting transients and the SRS effect when loading services in a C+L band optical network is solved by orchestration and network-wide coordination of optical power control functionality as addressed by an optical transport network disclosed herein. The optical transport network may comprise a first network element, a second network element and an optical fiber link.

In such an implementation, the first network element may comprise a first processor, a first wavelength selective switch having a first line port and a first system port, and a first memory comprising a non-transitory processor-readable medium storing a first orchestrator application and processor-executable instructions. The processor-executable instructions, when executed by the first processor, may cause the first processor to: generate, by the first orchestrator application, a request to modify one or more aspect of an optical service; and transmit, by the first orchestrator application, the request via the first line port.

The second network element may comprise a second processor, a second wavelength selective switch having a second line port and a second system port and exposing a control block, and a second memory comprising a non-transitory processor-readable medium storing a second orchestrator application, an optical topology and switching abstraction component, a power control sequencer, and processor-executable instructions. The processor-executable instructions, when executed by the second processor, may cause the second processor to: store, by the optical topology and switching abstraction component, a logical ROADM model of the second network element wherein the logical ROADM model is a logical model one or more component of the second network element including the second wavelength selective switch; receive, by the second orchestrator application, the request to modify one or more aspect of the optical service; determine, by the second orchestrator application, one or more component of the second network element affected by the request and based on the logical ROADM model; transmit, by the second orchestrator application to the power control sequencer, the request; determine, by the power control sequencer, one or more sequence of optical power control functions to be executed on the second wavelength selective switch, based on the request and the logical ROADM model of the optical topology and switching abstraction component; and transmit the one or more sequence to the control block of the second wavelength selective switch.

The optical fiber link may be optically coupled to the first line port and the second line port. The optical fiber link may be operable to carry an optical signal having the optical service in a plurality of passbands.

Implementations of the above techniques include methods, apparatus, systems, networks, and computer program products. One such computer program product is suitably embodied in a non-transitory machine-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features, and advantages will become apparent from the description, the drawings, and the claims.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings.

DETAILED DESCRIPTION

Figure 1:
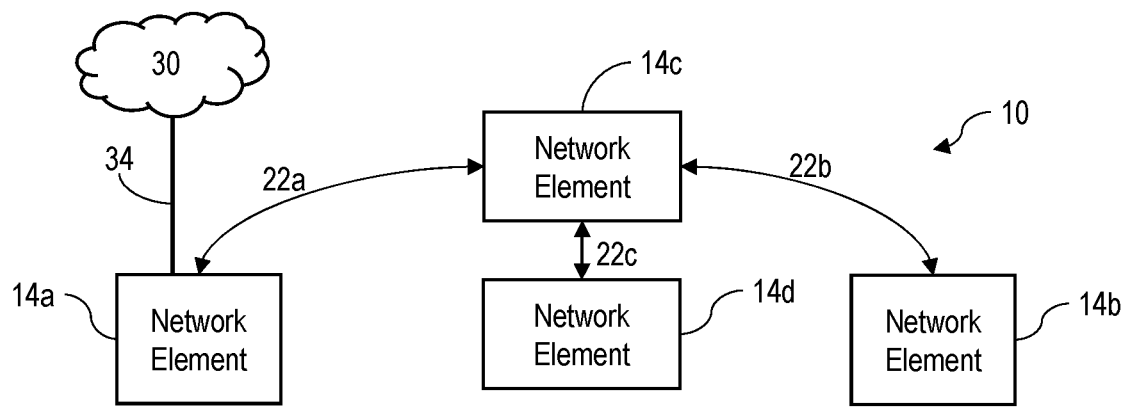
FIG. 1 is a block diagram of an exemplary implementation of an optical transport network constructed in accordance with the present disclosure.

The following detailed description of exemplary embodiments refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein are for purposes of description and should not be regarded as limiting.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise. Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one embodiment," "an embodiment," "some embodiments," "one implementation," "some implementations," "an implementation," "one example," "for example," or "an example" means that a particular element, feature, structure, or characteristic described in connection with the embodiment/implementation/example is included in at least one embodiment/implementation/example and may be used in conjunction with other embodiments/implementations/examples. The appearance of the phrase "in some embodiments" or "one example" or "in some implementations" in various places in the specification does not necessarily all refer to the same embodiment/implementation/example, for example.

Circuitry, as used herein, may be analog and/or digital components referred to herein as "blocks", or one or more suitably programmed processors (e.g., microprocessors) and associated hardware and software, or hardwired logic. Also, "components" or "blocks" may perform one or more functions. The term "component" or "block" may include hardware, such as a processor (e.g., a microprocessor), a combination of hardware and software, and/or the like. Software may include one or more processor-executable instructions that when executed by one or more components cause the component to perform a specified function. It should be understood that the algorithms described herein may be stored on one or more non-transitory memory. Exemplary non-transitory memory may include random access memory, read-only memory, flash memory, and/or the like. Such non-transitory memory may be electrically based, optically based, and/or the like.

Software may include one or more processor-readable instruction that when executed by one or more component, e.g., a processor, causes the component to perform a specified function. It should be understood that the algorithms described herein may be stored on one or more non-transitory processor-readable medium, which is also referred to herein as a non-transitory memory. Exemplary non-transitory processor-readable mediums may include random-access memory (RAM), a read-only memory (ROM), a flash memory, and/or a non-volatile memory such as, for example, a CD-ROM, a hard drive, a solid-state drive, a flash drive, a memory card, a DVD-ROM, a Blu-ray Disk, a disk, and an optical drive, combinations thereof, and/or the like. Such non-transitory processor-readable media may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

The generation of laser beams for use as optical data channel signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

As used herein, an "optical communication path" and/or an "optical route" may correspond to an optical path and/or an optical light path. For example, an optical communication path may specify a path along which light is carried between two or more network entities along a fiber optic link, e.g., an optical fiber.

The optical network has one or more band. A band is the complete optical spectrum carried on the optical fiber. Depending on the optical fiber used and the supported spectrum which can be carried over long distances with the current technology, relevant examples of the same are: C-Band/L-Band/Extended-C-Band. As used herein, the C-Band is a band of light having a wavelength between about 1530 nm and about 1565 nm. The L-Band is a band of light having a wavelength between about 1565 nm and about 1625 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, a spectral slice (a "slice") may represent a spectrum of a particular size in a frequency band (e.g., 12.5 gigahertz ("GHz"), 6.25 GHz, 3.125 GHz, etc.). For example, a 4.8 terahertz ("THz") frequency band may include 384 spectral slices, where each spectral slice may represent 12.5 GHz of the 4.8 THz spectrum. A slice may be the resolution at which the power levels can be measured by the optical power monitoring device. The power level being measured by the optical power monitoring device represents the total optical power carried by the portion of the band represented by that slice.

Spectral loading, or channel loading, is the addition of one or more channel to a specific spectrum of light described by the light's wavelength in an optical signal. When all channels within a specific spectrum are being utilized, the specific spectrum is described as fully loaded. A grouping of two or more channel may be called a channel group. Spectral loading may also be described as the addition of one or more channel group to a specific spectrum of light described by the light's wavelength to be supplied onto the optical fiber as the optical signal.

A WSS (Wavelength Selective Switch) is a component used in optical communications networks to route (switch) optical signals between optical fibers on a per-slice basis. Generally, power level controls can also be done by the WSS by specifying an attenuation level on a passband filter. A wavelength Selective Switch is a programmable device having source and destination fiber ports where the source and destination fiber ports and associated attenuation can be specified for a particular passband with a minimum bandwidth.

A reconfigurable optical add-drop multiplexer (ROADM) node is an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

An exemplary optical transport network consists of two distinct domains: Layer 0 ("optical domain" or "optical layer") and Layer 1 ("digital domain") data planes. Layer 0 is responsible for fixed or reconfigurable optical add/drop multiplexing (R/OADM) and optical amplification (EDFA or Raman) of optical channels and optical channel groups (OCG), typically within the 1530 nm-1565 nm range, known as C-Band. ROADM functions are facilitated via usage of a combination of colorless, directionless, and contentionless (CDC) optical devices, which may include wavelength selective switches (WSS), Multicast switches (MCS). Layer 0 may include the frequency grid (for example, as defined by ITU G.694.1), ROADMs, FOADMs, Amps, Muxes, Line-system and Fiber transmission, and GMPLS Control Plane (with Optical Extensions). Layer 1 functions encompass transporting client signals (e.g., Ethernet, SONET/SDH) in a manner that preserves bit transparency, timing transparency, and delay-transparency. The predominant technology for digital layer data transport in use today is OTN (for example, as defined by ITU G.709). Layer 1 may transport "client layer" traffic. Layer 1 may be a digital layer including multiplexing and grooming. The optical layer may further be divided into either an OTS layer or an OCH layer. The OTS layer refers to the optical transport section of the optical layer, whereas the OCH layer refers to one or more optical channels which are co-routed, e.g., together as multiple channels.

Referring now to the drawings, and in particular to FIG. 1, shown therein is a diagram of an exemplary implementation of an optical transport network 10 constructed in accordance with the present disclosure. The optical transport network 10 is depicted as having a plurality of network elements 14a-n, including a first network element 14a, a second network element 14b, a third network element 14c, and a fourth network element 14d. Though four network elements 14 are shown for exemplary purposes, it will be understood that the plurality of network elements 14a-n may comprise more or fewer network elements 14. Data transmitted within the optical transport network 10 from the first network element 14a to the second network element 14b may travel along an optical path formed from a first optical fiber link 22a, the third network element 14c, and, a second optical fiber link 22b to the second network element 14b.

In one embodiment, a user may interact with a computer system 30, e.g., via a user device, that may be used to communicate with one or more of the network elements 14a-n (hereinafter "network element 14") via a communication network 34.

In some implementations, the computer system 30 (described below in reference to FIG. 2 in more detail) may comprise a processor and a memory having a data store that may store data such as network element version information, firmware version information, sensor data, system data, metrics, logs, tracing, and the like in a raw format as well as transformed data that may be used for tasks such as reporting, visualization, analytics etc. The data store may include structured data from relational databases, semi-structured data, unstructured data, time-series data, and binary data. The data store may be a data base, a remote accessible storage, or a distributed filesystem. In some embodiments, the data store may be a component of an enterprise network.

In some implementations, the computer system 30 is connected to one or more network element 14 via the communication network 34. In this way, the computer system 30 may communicate with each of the one or more network element 14, and may, via the communication network 34 transmit or receive data from each of the one or more network element 14. In other embodiments, the computer system 30 may be integrated into each network element 14 and/or may communicate with one or more pluggable card within the network element 14. In some embodiments, the computer system 30 may be a remote network element.

The communication network 34 may permit bi-directional communication of information and/or data between the computer system 30 and/or the network elements 14 of the optical transport network 10. The communication network 34 may interface with the computer system 30 and/or the network elements 14 in a variety of ways. For example, in some embodiments, the communication network 34 may interface by optical and/or electronic interfaces, and/or may use a plurality of network topographies and/or protocols including, but not limited to, Ethernet, TCP/IP, circuit switched path, combinations thereof, and/or the like. The communication network 34 may utilize a variety of network protocols to permit bi-directional interface and/or communication of data and/or information between the computer system 30 and/or the network elements 14.

The communication network 34 may be almost any type of network. For example, in some embodiments, the communication network 34 may be a version of an Internet network (e.g., exist in a TCP/IP-based network). In one embodiment, the communication network 34 is the Internet. It should be noted, however, that the communication network 34 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like.

If the communication network 34 is the Internet, a primary user interface of the computer system 30 may be delivered through a series of web pages or private internal web pages of a company or corporation, which may be written in hypertext markup language, JavaScript, or the like, and accessible by the user. It should be noted that the primary user interface of the computer system 30 may be another type of interface including, but not limited to, a Windows-based application, a tablet-based application, a mobile web interface, a VR-based application, an application running on a mobile device, and/or the like. In one embodiment, the communication network 34 may be connected to one or more of the user devices, computer system 30, and the network elements 14a-n.

The optical transport network 10 may be, for example, considered as a graph made up of interconnected individual nodes (that is, the network elements 14). If the optical transport network 10 is an optical transport network, the optical transport network 10 may include any type of network that uses light as a transmission medium. For example, the optical transport network 10 may include a fiber-optic based network, an optical transport network, a light-emitting diode network, a laser diode network, an infrared network, a wireless optical network, a wireless network, combinations thereof, and/or other types of optical networks.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the optical transport network 10 may perform one or more functions described as being performed by another one or more of the devices of the optical transport network 10. Devices of the computer system 30 may interconnect via wired connections, wireless connections, or a combination thereof. For example, in one embodiment, the user device and the computer system 30 may be integrated into the same device, that is, the user device may perform functions and/or processes described as being performed by the computer system 30, described below in more detail.

Figure 2:
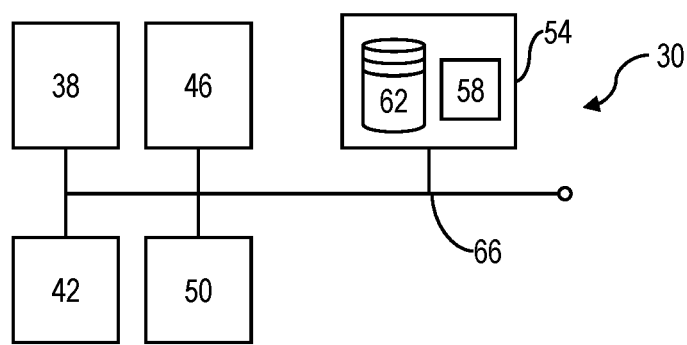
FIG. 2 is a diagram of an exemplary implementation of a computer system shown in FIG. 1 and constructed in accordance with the present disclosure.

Referring now to FIG. 2, shown therein is a diagram of an exemplary embodiment of the computer system 30 constructed in accordance with the present disclosure. In some embodiments, the computer system 30 may include, but is not limited to, implementations as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

In some embodiments, the computer system 30 may include one or more input devices 38 (hereinafter "input device 38"), one or more output devices 42 (hereinafter "output device 42"), one or more processors 46 (hereinafter "processor 46"), one or more communication devices 50 (hereinafter "communication device 50") capable of interfacing with the communication network 34, one or more non-transitory processor-readable medium (hereinafter "computer system memory 54") storing processor-executable code and/or software application(s) 58, a database 62, for example including, a web browser capable of accessing a website and/or communicating information and/or data over a wireless or wired network (e.g., the communication network 34), and/or the like. The input device 38, the output device 42, the processor 46, the communication device 50, and the computer system memory 54 may be connected via a path 66 such as a data bus that permits communication among the components of the computer system 30.

In some implementations, the processor 46 may comprise one or more processor 46 working together, or independently, to read and/or execute processor executable code and/or data, such as stored in the computer system memory 54. The processor 46 may be capable of creating, manipulating, retrieving, altering, and/or storing data structures into the computer system memory 54. Each element of the computer system 30 may be partially or completely network-based or cloud-based, and may or may not be located in a single physical location.

Exemplary implementations of the processor 46 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 46 may be capable of communicating with the computer system memory 54 via the path 66 (e.g., data bus). The processor 46 may be capable of communicating with the input device 38 and/or the output device 42.

The processor 46 may be further capable of interfacing and/or communicating with the network elements 14 via the communication network 34 using the communication device 50. For example, the processor 46 may be capable of communicating via the communication network 34 by exchanging signals (e.g., analog, digital, optical, and/or the like) via one or more ports (e.g., physical or virtual ports) using a network protocol to provide information to the one or more network element 14.

The computer system memory 54 may store a software application 58 that, when executed by the processor 46, causes the computer system 30 to perform an action such as communicate with, or control, one or more component of the computer system 30, the optical transport network 10 (e.g., the one or more network element 14*a-n*) and/or the communication network 34. The software application 58 may be an SPCO 200 or one or more service component of the SPCO 200, as described below in more detail.

In some implementations, the computer system memory 54 may be located in the same physical location as the computer system 30, and/or one or more computer system memory 54 may be located remotely from the computer system 30. For example, the computer system memory 54 may be located remotely from the computer system 30 and communicate with the processor 46 via the communication network 34. Additionally, when more than one computer system memory 54 is used, a first computer system memory may be located in the same physical location as the processor 46, and additional computer system memory may be located in a location physically remote from the processor 46. Additionally, the computer system memory 54 may be implemented as a "cloud" non-transitory processor-readable storage memory (i.e., one or more of the computer system memory 54 may be partially or completely based on or accessed using the communication network 34).

In one implementation, the database 62 may be a time-series database, a relational database or a non-relational database. Examples of such databases comprise, DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The database 62 can be centralized or distributed across multiple systems.

The input device 38 may be capable of receiving information input from the user, another computer, and/or the processor 46, and transmitting such information to other components of the computer system 30 and/or the communication network 34. The input device 38 may include, but is not limited to, implementation as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 42 may be capable of outputting information in a form perceivable by the user, another computer system, and/or the processor 46. For example, implementations of the output device 42 may include, but are not limited to, a computer monitor, a screen, a touchscreen, a speaker, a website, a television set, a smart phone, a PDA, a cell phone, a fax machine, a printer, a laptop computer, a haptic feedback generator, a network interface, combinations thereof, and the like, for example. It is to be understood that in some exemplary embodiments, the input device 38 and the output device 42 may be implemented as a single device, such as, for example, a touchscreen of a computer, a tablet, or a smartphone. It is to be further understood that as used herein the term "user" is not limited to a human being, and may comprise a computer, a server, a website, a processor, a network interface, a user terminal, a virtual computer, combinations thereof, and/or the like, for example.

Figure 3A:
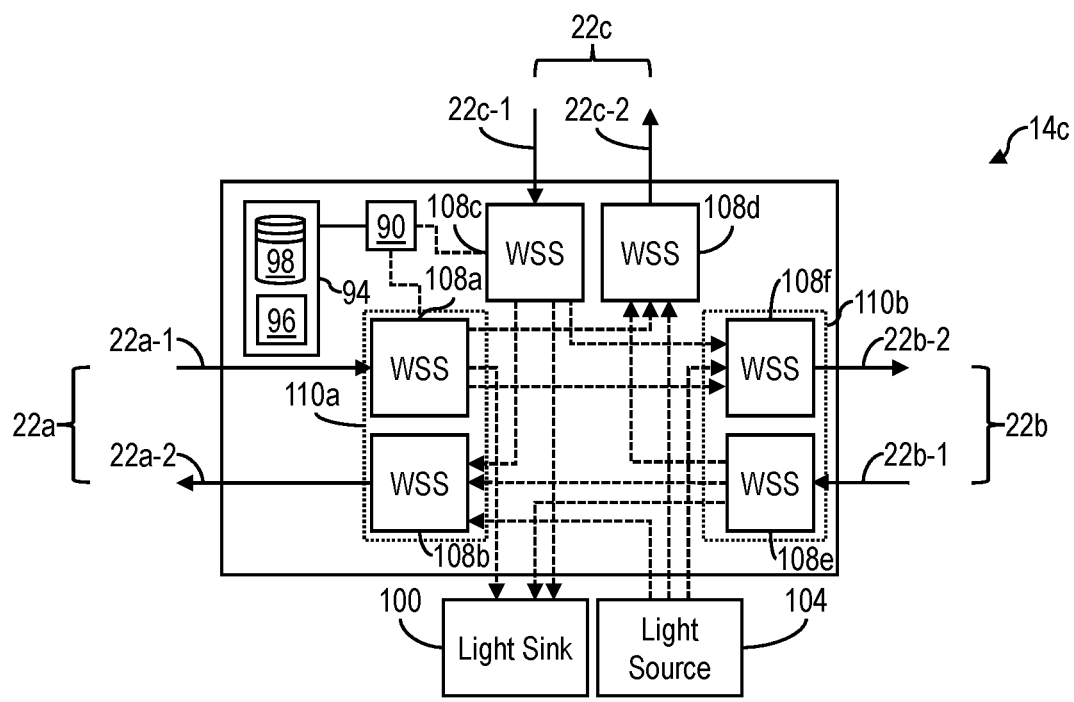
FIG. 3A is a block diagram of an exemplary implementation of the network element being a reconfigurable optical add/drop multiplexer constructed in accordance with the present disclosure.

Referring now to FIG. 3A, shown therein is a block diagram of an exemplary implementation of the network element 14 constructed in accordance with the present disclosure. In general, the network element 14 transmits and receives data traffic and control signals.

Nonexclusive examples of alternative implementations of the network element 14 include optical line terminals (OLTs), optical cross connects (OXCs), optical line amplifiers, optical add/drop multiplexer (OADMs) and/or reconfigurable optical add/drop multiplexers (ROADMs), interconnected by way of optical fiber links. OLTs may be used at either end of a connection or optical fiber link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803 (Application Publication Number 20090245289), titled "Programmable Time Division Multiplexed Switching," the entire contents of each of which are hereby incorporated herein by reference in its entirety. Because SPCO 200 is deployed on a ROADM, as used herein, the network element 14 is implemented as a ROADM unless specifically stated otherwise.

FIG. 3A illustrates an example of the third network element 14*c* being a ROADM that interconnects the first optical fiber link 22*a*, the second optical fiber link 22*b*, and the third optical fiber link 22*c*. Each of the first optical fiber link 22a, the second optical fiber link 22b, and the third optical fiber link 22c may include optical fiber pairs, wherein each fiber of the pair carries optical signal groups propagating in opposite directions. As seen in FIG. 3A, for example, the first optical fiber link 22a includes a first optical fiber 22a-1, which carries optical signals toward third network element 14c and a second optical fiber 22a-2 that carries optical signals out from the third network element 14c. Similarly, the second optical fiber link 22b may include optical fibers 22b-1 and 22b-2 carrying optical signal groups to and from the third network element 14c, respectively. Further, the third optical fiber link 22c may include first optical fiber 22b-1 and second optical fiber 22b-2 also carrying optical signals to and from the third network element 14c, respectively. Additional nodes, not shown in FIG. 3A, may be provided that supply optical signal groups to and receive optical signal groups from the third network element 14c. Such nodes may also have a ROADM having the same or similar structure as that of the third network element 14c.

As further shown in FIG. 3A, a light sink 100 (described below in more detail and shown in FIG. 3B) and a light source 104 (described below in more detail and shown in FIG. 3C) may be provided and in communication with the third network element 14c to drop and add optical signal groups, respectively.

As shown in FIG. 3A, the third network element 14c may include a plurality of wavelength selective switches (WSSs 108), such as first, second, third, fourth, fifth, and sixth WSSs 108a-f. Wavelength selective switches are components that can dynamically route, block and/or attenuate received optical signal groups input from and output to optical fiber links 22a-n. In addition to transmitting/receiving optical signal groups from network elements 14, optical signal groups may also be input from or output to the light source 104 and light sink 100, respectively.

In one embodiment, the WSSs 108 for a particular degree, along with associated FRM memory 188 and FRM processor 186 (shown in FIG. 3D), may be collectively referred to as a flexible ROADM module, or FRM 110. For example, as shown in FIG. 3A, a first WSS 108a and a second WSS 108b may be part of a first FRM 110a, and a sixth WSS 108f and a fifth WSS 108e may be part of a third FRM 110c.

In one embodiment, each WSS 108 may include a reconfigurable, optical filter operable to allow a passband (e.g., particular bandwidth of the spectrum of the optical signal) to pass through or be routed as herein described.

As further shown in FIG. 3A, each WSS 108a-f can receive optical signal groups (e.g., optical passbands) and may be operable to selectively switch, or direct, such optical signal groups to other WSSs for output from the third network element 14c. For example, the first WSS 108a may receive optical signal groups on a first optical fiber 22a-1 and supply certain optical signal groups to the sixth WSS 108f, while others are supplied to a fourth WSS 108d. Those supplied to the sixth WSS 108f may be output to a downstream network element 14, such as the second network element 14b (FIG. 1) on a fourth optical fiber 22b-2, while those supplied to the fourth WSS 108d may be output to the fourth network element 14d on a sixth optical fiber 22c-2. Also, optical signal groups input to the third network element 14c on a third optical fiber 22b-1 may be supplied by the fifth WSS 108e to either the second WSS 108b and on to the first network element 14a via the second optical fiber 22a-2 or the fourth WSS 108d and on to the fourth network element 14d via the sixth optical fiber 22c-2. Moreover, the third WSS 108c may selectively direct optical signal groups (e.g., selectively switch optical passband groups) input to the third network element 14c from the fifth optical fiber 22c-1 to either the second WSS 108b and onto the first network element 14a via the second optical fiber 22a-2 or to the sixth WSS 108f and onto the second network element 14b via the fourth optical fiber 22b-2.

The first WSS 108a, third WSS 108c, and fifth WSS 108e may also selectively or controllably supply optical signal groups to the light sink 100 and optical signal groups may be selectively output from the light source 104 in the third network element 14c. The optical signal groups output from the light source 104 may be selectively supplied to one or more of the second WSS 108b, fourth WSS 108d, and sixth WSS 108f, for output on to the second optical fiber 22a-2, fourth optical fiber 22b-2, and sixth optical fiber 22c-2, respectively.

In one implementation, the third network element 14c may further comprise a node processor 90 and a non-transitory computer readable medium referred to herein as node memory 94. The node processor 90 may include, but is not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The node processor 90 is in communication with the node memory 94 and may be operable to read and/or write to the node memory 94. The node processor 90 may be capable of communicating with one or more of the WSSs 108 (shown as in communication with the third WSS 108c and the first WSS 108a for simplicity, however, the node processor 90 may be in communication with each WSS 108) or each FRM 110. The node processor 90 may be further capable of interfacing and/or communicating with the network elements 14 via the communication network 34. For example, the node processor 90 may be capable of communicating via the communication network 34 by exchanging signals (e.g., analog, digital, optical, and/or the like) via one or more ports (e.g., physical or virtual ports) using a network protocol to provide information to the one or more network element 14. In one embodiment, the node processor 90 may be referred to as a node processor and the node memory 94 may be referred to as a node memory 94.

In one implementation, the node memory 94 of the network element 14, such as of the third network element 14c, may store a software application 96, such as an orchestrator application (e.g., the SPCO 200 or one or more service component of the SPCO 200 such as orchestrator 202, described below in more detail) that, when executed by the node processor 90, causes the node processor 90 to perform an action, for example, communicate with or control one or more component of the network element 14 such as control one or more of the WSS 108 or the FRM 110.

In one implementation, the node memory 94 may store one or more of the datastore 98. The datastore 98 may include, for example, structured data from relational databases, semi-structured data, unstructured data, time-series data, binary data, and the like and/or some combination thereof. The datastore 98 may be a data base, a remote accessible storage, or a distributed filesystem. In some embodiments, the datastore 98 may be a component of an enterprise network.

Figure 3B:
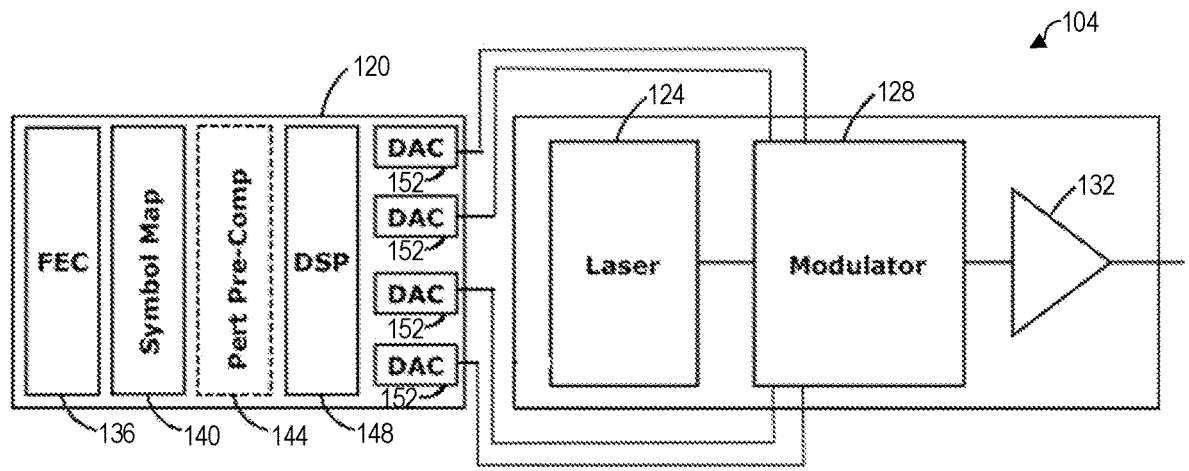
FIG. 3B is a diagram of an exemplary implementation of a light source of FIG. 3A constructed in accordance with the present disclosure.

Referring now to FIG. 3B, shown therein is a diagram of an exemplary implementation of the light source 104 of FIG. 3A constructed in accordance with the present disclosure. The light source 104 may comprise one or more transmitter processor circuit 120, one or more laser 124, one or more modulator 128, one or more semiconductor optical amplifier 132, and/or other components (not shown).

The transmitter processor circuit 120 may have a Transmitter Forward Error Correction (FEC) circuitry 136, a Symbol Map circuitry 140, a transmitter perturbative pre-compensation circuitry 144, one or more transmitter digital signal processor (DSP) 148, and one or more digital-to-analogue converters (DAC) 152. The transmitter processor circuit 120 may be located in any one or more components of the light source 104, or separate from the components, and/or in any location(s) among the components. The transmitter processor circuit 120 may be in the form of one or more Application Specific Integrated Circuit (ASIC), which may contain one or more module and/or custom module.

Processed electrical outputs from the transmitter processor circuit 120 may be supplied to the modulator 128 for encoding data into optical signals generated and supplied to the modulator 128 from the laser 124. The semiconductor optical amplifier 132 receives, amplifies, and transmits the optical signal including encoded data in the spectrum. Processed electrical outputs from the transmitter processor circuit 120 may be supplied to other circuitry in the transmitter processor circuit 120, for example, clock and data modification circuitry. The laser 124, modulator 128, and/or semiconductor optical amplifier 132 may be coupled with a tuning element (e.g., a heater) (not shown) that can be used to tune the wavelength of an optical signal channel output by the laser 124, modulator 128, or semiconductor optical amplifier 132. In some implementations, a single one of the laser 124 may be shared by multiple light source 104.

Other possible components in the light source 104 may include filters, circuit blocks, memory, such as non-transitory memory storing processor executable instructions, additional modulators, splitters, couplers, multiplexers, etc., as is well known in the art. The components may be combined, used, or not used, in multiple combinations or orders. Optical transmitters are further described in U.S. Patent Publication No. 2012/0082453, the content of which is hereby incorporated by reference in its entirety herein.

Figure 3C:
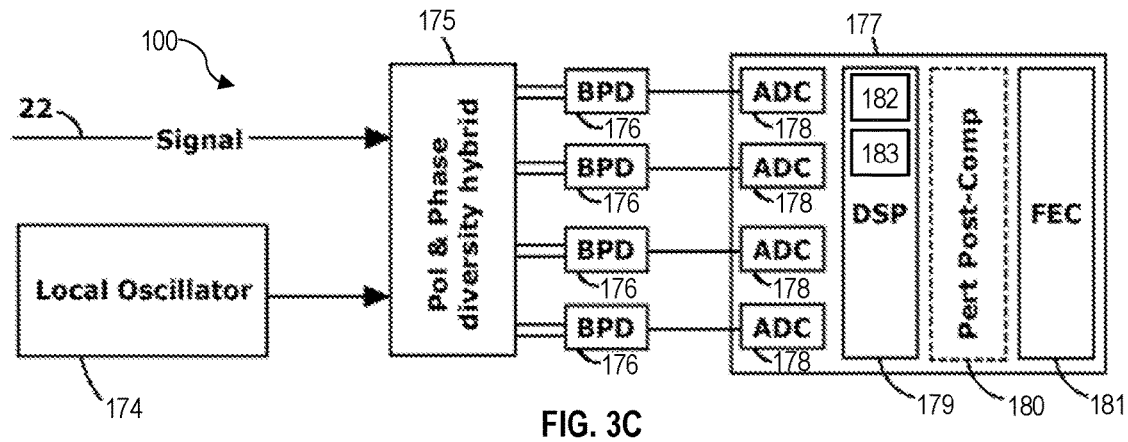
FIG. 3C is a block diagram of an exemplary implementation of a light sink constructed in accordance with the present disclosure.

Referring now to FIG. 3C, shown therein is a block diagram of an exemplary implementation of the light sink 100 constructed in accordance with the present disclosure. The light sink 100 may comprise one or more local oscillator 174, a polarization and phase diversity hybrid circuit 175 receiving the one or more channel from the optical signal and the input from the local oscillator 174, one or more balanced photodiode 176 that produces electrical signals representative of the one or more channel on the spectrum, and one or more receiver processor circuit 177. Other possible components in the light sink 100 may include filters, circuit blocks, memory, such as non-transitory processor-readable memory storing processor-executable instructions, additional modulators, splitters, couplers, multiplexers, etc., as is well known in the art. The components may be combined, used, or not used, in multiple combinations or orders. The light sink 100 may be implemented in other ways, as is well known in the art. Exemplary implementations of the light sink 100 are further described in U.S. patent application Ser. No. 12/052,541, titled "Coherent Optical Receiver", the entire contents of which are hereby incorporated by reference.

The one or more receiver processor circuit 177, may comprise one or more analog-to-digital converter (ADC) 178 receiving the electrical signals from the balanced photodiodes 176, one or more receiver digital signal processor (hereinafter, receiver DSP 179), receiver perturbative post-compensation circuitry 180, and receiver forward error correction circuitry (hereinafter, receiver FEC circuitry 181). The receiver FEC circuitry 181 may apply corrections to the data, as is well known in the art. The one or more receiver processor circuit 177 and/or the one or more receiver DSP 179 may be located on one or more component of the light sink 100 or separately from the components, and/or in any location(s) among the components. The receiver processor circuit 177 may be in the form of an Application Specific Integrated Circuit (ASIC), which may contain one or more module and/or custom module. In one embodiment, the receiver DSP 179 may include, or be in communication with, one or more processor 182 and one or more memory 183 storing processor readable instructions, such as software, or may be in communication with the node processor 90 and the node memory 94.

The one or more receiver DSP 179 may receive and process the electrical signals with multi-input-multiple-output (MIMO) circuitry, as described, for example, in U.S. Pat. No. 8,014,686, titled "Polarization demultiplexing optical receiver using polarization oversampling and electronic polarization tracking", the entire contents of which are hereby incorporated by reference herein. Processed electrical outputs from receiver DSP 179 may be supplied to other circuitry in the receiver processor circuit 177, such as the receiver perturbative post-compensation circuitry 180 and the receiver FEC circuitry 181.

Various components of the light sink 100 may be provided or integrated, in one example, on a common substrate. Further integration is achieved by incorporating various optical demultiplexer designs that are relatively compact and conserve space on the surface of the substrate.

In use, the one or more channel of the spectrum may be subjected to optical non-linear effects between the light source 104 and the light sink 100 such that the spectrum received does not accurately convey carried data in the form that the spectrum was transmitted. The impact of optical nonlinear effects can be partially mitigated by applying perturbative distortion algorithms using one or more of the transmitter perturbative pre-compensation circuitry 171 and the receiver perturbative post-compensation circuitry 180. The amount of perturbation may be calculated using coefficients in algorithms and known or recovered transmitted data. The coefficients may be calculated, in accordance with U.S. Pat. No. 9,154,258 entitled "Subsea Optical Communication System Dual Polarization Idler", herein incorporated by reference in its entirety, by use of analysis of one or more incoming channel at the light sink 100.

Figure 3D:
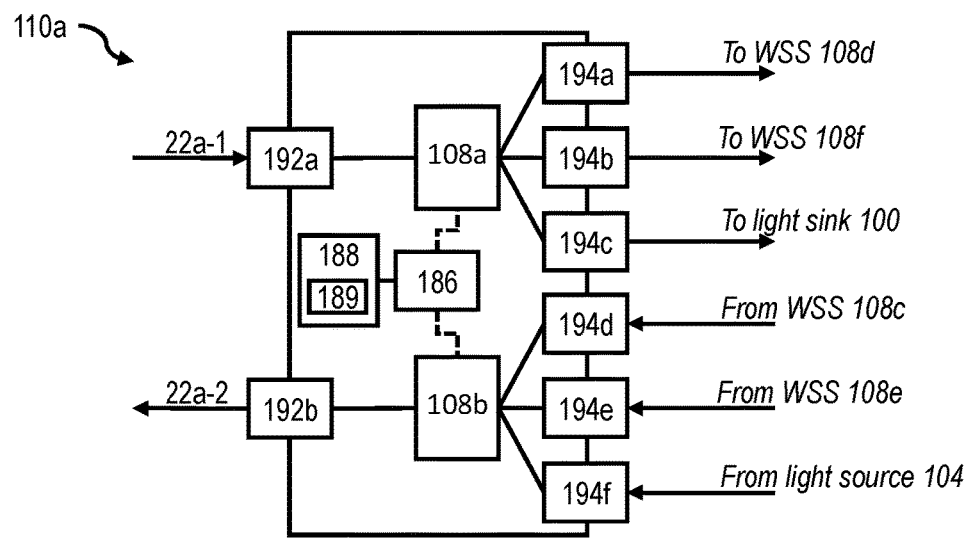
FIG. 3D is a diagram of an exemplary implementation of a flexible ROADM module (FRM) constructed in accordance with the present disclosure.

Referring now to FIG. 3D, shown therein is a diagram of an exemplary implementation of the first FRM 110a constructed in accordance with the present disclosure. The first FRM 110a generally comprises a FRM processor 186 in communication with a FRM memory 188, the first WSS 108a, and the second WSS 108b. The first WSS 108a is in optical communication with a first line port 192a operable to receive the optical signal from the first optical fiber 22a-1 and is in optical communication with two or more system ports 194 (shown in FIG. 3D as a first system port 194a, a second system port 194b, and a third system port 194c) to selectively output one or more passband to one or more of the system ports 194. The second WSS 108b is in optical communication with a second line port 192b operable to output an optical signal to the optical fibers 22a-b and is in optical communication with two or more system ports 194 (shown in FIG. 3D as fourth system port 194d, fifth system port 194e, and sixth system port 194f) to selectively output one or more passband to the second line port 192b. In one embodiment, the first WSS 108a (as well as other wavelength selective switches demultiplexing an incoming optical signal such as the third WSS 108*c* and the fifth WSS 108*e*) may be considered a DEMUX WSS and the second WSS 108*b* (as well as other wavelength selective switches multiplexing one or more incoming optical signal into an optical signal output to an optical fiber link 22, such as the fourth WSS 108*d* and the sixth WSS 108*f*) may be considered a MUX WSS. The number of components illustrated in FIG. 3D is provided for explanatory purposed. In practice, there may be additional components, such as one or more EDFA, fewer components, different components, and/or differently arranged components than shown in FIG. 3D.

In one implementation, each of the system ports 194*a*-*n* may have a port type of either an express port or an add/drop port. For example, the first system port 194*a*, optically coupled to the fourth WSS 108*d*, and the second system port 194*b*, optically coupled to the sixth WSS 108*f*, may have a port type of express port and may be considered express ports, while the third system port 194*c*, optically coupled to the light sink 100, may have a port type of add/drop port and may be considered a drop port. Similarly, the fourth system port 194*d*, optically coupled to the third WSS 108*c*, and the fifth system port 194*e*, optically coupled to the fifth WSS 108*e*, may have a port type of express port and may be considered express ports, while the sixth system port 194*f*, optically coupled to the light source 104, may have a port type of add/drop port and may be considered an add port.

In one implementation, the first FRM 110*a* is a C-Band FRM, that is, the components of the first FRM 110*a* operate on the C-Band of the optical spectrum. In other embodiments, the first FRM 110*a* is an L-Band FRM, that is, the components of the first FRM 110*a* operate on the L-Band of the optical spectrum. In yet another implementation, the first FRM 110*a* is a C+L-Band FRM having components that operate on the C-Band and the L-Band. The number of devices illustrated in FIG. 3D is provided for explanatory purposes. In practice, there may be additional devices, fewer devices, different devices, or differently arranged devices than are shown in FIG. 3D. Furthermore, two or more of the devices illustrated in FIG. 3D may be implemented within a single device, or a single device illustrated in FIG. 3D may be implemented as multiple, distributed devices. For example, the C+L-Band FRM may comprise an L-Band FRM optically coupled to a C-Band FRM.

In one implementation, the FRM memory 188 may be constructed in accordance with the computer system memory 54 and/or the node memory 94 as described above in more detail. The FRM memory 188 may comprise a non-transitory processor-readable medium storing processor-executable instructions such as a FRM software application 189. The FRM software application 189 includes instructions that, when executed by the FRM processor 186, cause the FRM processor 186 to control the first WSS 108*a* and/or the second WSS 108*b*.

In a first aspect, an incoming optical signal having multiple optical channels enters the first line port 192*a* via the first optical fiber 22*a*-1 and is directed to the first WSS 108*a*. The incoming optical signal is split into one or more segments by the first WSS 108*a*, each segment having one or more optical channel. The one or more segments of the incoming optical signal are then directed to one or more system port 194*a*-*c*, for example, the first WSS 108*a* may direct one or more segment to one or more of the fourth WSS 108*d* via the first system port 194*a*, the sixth WSS 108*f* via the second system port 194*b*, and/or the light sink 100 via the third system port 194*c*.

In a second aspect, a first incoming optical signal enters the fourth system port 194*d*, a second incoming optical signal enters the fifth system port 194*e*, and a third incoming optical signal enters the fifth system port 194*e* and each incoming optical signal is directed to the second WSS 108*b*. The second WSS 108*b*, as directed by the FRM processor 186, may combine the first incoming optical signal, the second incoming optical signal, and the third incoming optical signal into a combined optical signal that is sent on the second optical fiber 22*a*-2 via the second line port 192*b*. For example, the second WSS 180*b* may receive the first incoming optical signal from the third WSS 108*c* via the fourth system port 194*d*, the second incoming optical signal from the fifth WSS 108*e* via the fifth system port 194*e*, and the third incoming optical signal from the light source 104 via the sixth system port 194*f*.

While each of the above aspects and the illustration of the first WSS 108*a* and the second WSS 108*b* in FIG. 3D show the first WSS 108*a* and the second WSS 108*b* with only three of the system ports 194, a person having ordinary skill in the art would recognize that the first WSS 108*a* and the second WSS 108*b* may have as few as two system ports 194 and as many system ports 194 as the WSS 108 is operable to selectively output or combine. In some embodiments, each WSS 108 may have any number of system ports 194 in a range of 2 and 16 system ports 194.

Figure 4:
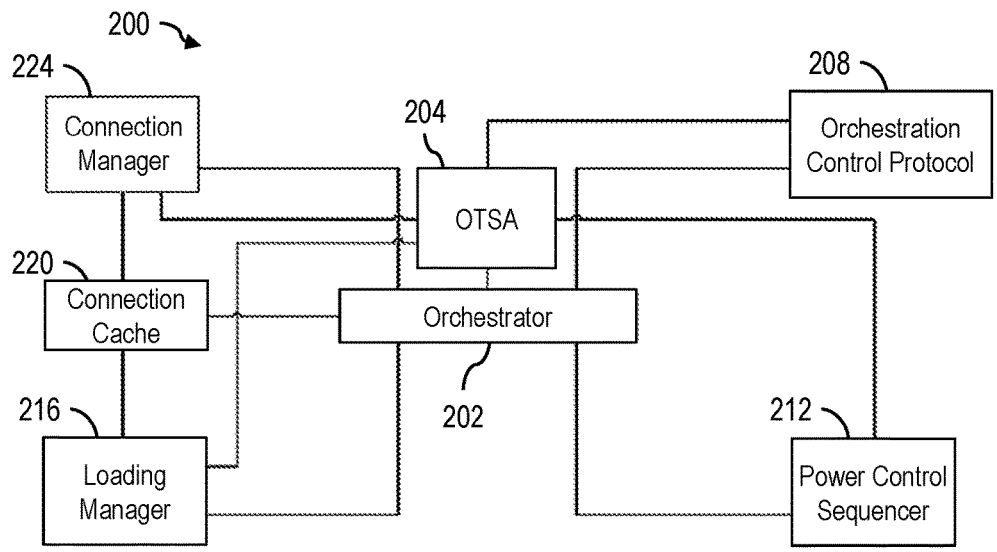
FIG. 4 is a software architecture diagram of an exemplary implementation of a Service and Power Control Orchestrator constructed in accordance with the present disclosure.

Referring now to FIG. 4, shown therein is a software architecture diagram of an exemplary implementation of a Service and Power Control Orchestrator 200 (hereinafter, SPCO 200) constructed in accordance with the present disclosure. As previously described, the SPCO 200 and/or one or more service component of the SPCO 200 may be, or be part of, the software application 58 stored on the computer system memory 54 of the computer system 30 (FIG. 2); and/or the SPCO 200 and/or one or more service component of the SPCO 200 may be, or be part of, the software application 96 stored on the node memory 94 of the network element(s) 14 (FIG. 3A); and/or the SPCO 200 and/or one or more service component of the SPCO 200 may be, or be part of, the FRM software application 189 stored on the FRM memory 188 of the FRM(s) 110 (FIG. 3D).

Generally, the SPCO 200 comprises, or interfaces with, one or more service components such as an orchestrator 202, an optical topology and switching abstraction component 204 (hereinafter, OTSA 204), an orchestration control protocol 208 (hereinafter, OCP 208), a power control sequencer 212 (hereinafter, PCS 212), a loading manager 216, a connection cache 220, and a connection manager 224. While the aforementioned service components are shown in FIG. 4, the SPCO 200 may interface with additional service components not shown. Generally, the SPCO 200 is a software component operable to sequence the optical power control functions such that an optical service is turned-up (activated) or turned-down (deactivated) without any transients being introduced on the optical signal of a C+L band network domain. In other words, the SPCO 200 may generate one or more service loading sequence. The service loading sequence may be the sequence that the optical service is activated or deactivated. In one embodiment, the SPCO 200 determines when a specific optical power control loop function should be executed and in what sequence, e.g., as a workflow.

In one implementation, the SPCO 200 is responsible for sequencing of local power control functions and link level optical power control functions on a particular one of the network element 14 into a power control operation sequence (PCO sequence) such that power control operations are executed in a correct sequence. Generally, sequencing of local power control functions and link level optical power control functions may be delegated to one or more service component, such as the PCS 212.

In one implementation, the SPCO 200 is responsible for network-wide service activation and deactivation such that the risk of transients and/or SRS tilt in the optical signal is mitigated. Generally, network-wide activation and deactivation function may be delegated to one or more service component, such as the OCP 208.

In one implementation, the SPCO 200 is responsible for passband fault handling including signaling of passband level fault indications to dependent downstream segments such that corresponding DEMUX SPCO and MUX SPCO deactivate affected passbands, e.g., passbands experiencing one or more passband fault.

In one implementation, the SPCO 200 is responsible for automation of controlled operations functions such as Card Locks and Cold Resets. Card locks and cold resets should only be carried out after deactivation of services configured on that particular network element or component such that other services sharing a particular one of the optical fiber link 22 with the deactivated service(s) do not experience transients.

In one implementation, the SPCO 200 is responsible for automation of fault recovery functions such that, on recovery of the fault, services impacted by the fault are re-activated without causing transients on any part of the optical transport network 10.

In one implementation, the orchestrator 202 is implemented in software. The orchestrator 202 coordinates with each of the service components of the SPCO 200. The orchestrator 202, by coordinating with each service component, achieves optical service turn-up/turn-down through orchestration of power control functions. In one implementation, the orchestrator 202 tracks passband level finite state machines (FSMs) to pick an appropriate workflow to be executed. As used herein, the workflow is a set of one or more tasks executed by the SPCO 200 to load one or more optical service, e.g., to perform one or more loading operation such as activation or deactivation of optical services. Additionally, passband level FSMs may include passband level states such as up or down status (e.g., is the passband activated or deactivated), shutdown status, active status and/ fault status and/or the like. In one implementation, the orchestrator 202 is operable to interface between one or more requestor (entity requesting an optical service activation and/or deactivation) and actual optical service activation and/or deactivation on a C+L band network domain.

In one implementation, the orchestrator 202 serves as a central point with respect to all decisions within the SPCO 200. For example, the orchestrator 202 may determine when to issue a loading request to a control block or a PCO request (i.e., a power control operation request) to a downstream ROADM, or to signal a passband's loading state in the OCP 208. In one implementation, the orchestrator 202 may delegate orchestration functionality to one or more service component as described below. For example, optimizing passband batches may be delegated to the loading manager 216 and PCO requests, service loading request, and/or passband loading requests may be delegated to the PCS 212. Additionally, in some implementations, the orchestrator 202 may delegate inter-node communications to the OCP 208, topology related configuration details are provided by the OTSA 204, and connection related details are provided by the connection manager 224.

In one implementation, the OTSA 204 may be an optical topology and switching abstraction model. The OTSA 204 may be a logical ROADM model or a logical FRM model, for example. The OTSA 204 may serve as a central repository of logical ROADM model.

In one implementation, the OTSA 204 may be implemented in software and provide an application programming interface (API) operable to receive a request for the logical ROADM model and provide at least a portion of the logical ROADM model to the requestor.

In one implementation, the OTSA 204 may be implemented in software and provide a subscription service operable to receive a subscription request from a particular service component, and, when the logical ROADM model is updated, the OTSA 204 may notify the particular service component of the change.

In one implementation, the OCP 208 may be implemented in software and manages network level coordination of power control functions. Generally, the OCP 208 may perform one or more of the following: neighbor adjacency management; handle requests from the orchestrator 202 for service activation or service deactivation on one or more local one of the WSS 108; handle a neighbor's request for service activation or service deactivation on one or more local one of the WSS 108; handle passband state notifications; periodically refresh passband activation states; synchronize local and neighbor node restarts; and aid in recovery of neighbor node after a communication failure/restart.

In one implementation, the OCP 208 may be implemented as described in the U.S. Patent Application No. 63/305,758 entitled "Orchestration Control Protocol", filed on Feb. 2, 2022, the entire contents of which are hereby incorporated herein in their entirety.

In one implementation, the PCS 212 may be implemented in software and is operable to sequence optical power control operations. When the orchestrator 202 requests that the PCS 212 perform a power control operation request (PCO request), the PCS 212 generates an ordered list of power control operations to be carried out. In some embodiments, the PCS 212 further executes the ordered list of power control operations. In one embodiment, the PCS 212 utilizes one or more platform-specific component Power Control Agent (PCA) to execute the ordered list of power control operations. In one embodiment, the PCS 212 may further consolidate and report the state of each control block 404 (described below). In one implementation, the PCS 212 may interface with one or more WSS MUX Control (MCL) power control block, WSS DEMUX Control (DMCL) power control block; and/or link level optical power control block. In one implementation, a PCA may be a C-Band PCA or an L-Band PCA. The C-Band PCA may provide a composite view of a MUX control block 404a (FIG. 9), a DEMUX control block 404b (FIG. 9), and a link level optical power control block while the L-Band PCA may provide a composite view of just the MUX control block 404a and the DEMUX control block 404b. In one implementation, each PCA may abstract power control modules and provide a generic interface operable to receive one or more communication from the SPCO 200.

In one implementation, the PCS 212 fetches and stores control block information for one or more control block 404 from the OTSA 204. The PCS 212 may determine which PCO should be executed on which control block 404 based on the PCO request from the orchestrator 202. In one implementation, the PCS 212 may generate a dependency graph for each PCO request by decomposing the PCO request into one or more PCO. The dependency graph may represent a dependency relationship among the PCOs in the PCO request and therefore may determine a sequencing or execution order of the PCOs in the PCO request.

In one implementation, the PCA may be a software component hosted on each line card (e.g., FRM 110) and act as an interface between the PCS 212 and the one or more control blocks 404. The PCS 212 may communicate with each PCA via a unique namespace identifying that PCA. In one implementation, the PCS 212 utilizes a dedicated thread pool to delegate the execution of PCOs to appropriate PCAs. Because the orchestrator 202 of the SPCO 200 communicates with the PCA via the PCS 212, the orchestrator 202 and the SPCO 200 may be considered location independent, that is, the SPCO 200 and the orchestrator 202 may be deployed at one or more of the line card level (i.e., on an FRM 110) or on a controller card in a network element 14 (e.g., on the node memory 94 accessible by the node processor 90).

In one implementation, the PCA may provide an aggregated view of one or more control block 404 and provides access to the control blocks 404 to perform power control operations (PCOs) and to retrieve a control status (as described below). In one implementation, asynchronous updates from control blocks 404 may be channeled via the PCA, through the PCS 212 to the orchestrator 202. The PCA may aggregate one or more control status into one report and transmit that report to the orchestrator 202 as herein described.

In one implementation, the loading manager 216 may be implemented in software and may be operable to manage loading operations (such as service activation and/or service deactivation) on a degree-based loading policy. In some implementations, the degree-based loading policy may be predefined, however, in other embodiments, the degree-based loading policy may be user provisioned.

In one implementation, the loading manager 216 may be implemented as described in the U.S. patent application Ser. No. 18/146,684 entitled "Grouping of Optical Passbands for Loading in an Optical Transmission Spectrum Using an Affinity Identifier", filed on Dec. 27, 2022 or in the U.S. patent application Ser. No. 18/146,654 entitled "User Configurable Spectral Loading in an Optical Line System using Policies and Parameters", filed on Dec. 27, 2022, the entire contents of both of which are hereby incorporated herein in their entirety.

In one implementation, the orchestrator 202 may send one or more request to the loading manager 216 to cause the loading manager 216 to apply the loading policy on one or more passband to be activated and/or deactivated on a particular degree. The loading manager 216 may further generate one or more batch of passbands to be activated and/or deactivated. In one implementation, the one or more batch is an ordered sub-set of the one or more passband to be activated and/or deactivated on the particular degree.

In one implementation, the connection cache 220 may be implemented in software and may be operable to provide a cache API. The cache API may be operable to receive a request querying connection information and in response to the query, provide one or more information of the connection information. The connection information may be a single source of "truth" for service components. The connection cache 220 may store the activation state of the passbands and, thus, associated connections. The cache API may be queried from one or more perspective, such as, for example, a service perspective, a passband perspective, and/or a carrier perspective.

In one implementation, the connection manager 224 may be implemented in software and is operable to manage provisioning of one or more optical service within the SPCO 200. In some embodiments, the connection manager 224 manages provisioning of all optical services within the SPCO 200. In one implementation, each optical service may be either a manual optical connection or a signaled optical circuit through the Generalized Multiprotocol Label Switching (GMPLS) layer.

In one implementation, the connection manager 224 may send one or more signal to the connection cache 220 operable to update connection information stored in and/or by the connection cache 220. In one implementation, the connection manager 224 may send one or more signal to the orchestrator 202 indicative of one or more connection operation being (or to be) carried out. When the orchestrator 202 receives the signal, the orchestrator 202 may load passband information pertaining to the one or more connection operation and operate on the passband information, e.g., transmit the passband information to one or more service component such as the loading manager 216. In one implementation, the connection manager 224 may consolidate one or more state, such as an Activation State, at the connection level.

In one implementation, the SPCO 200 and one or more service component of the SPCO 200 may be implemented as software and stored on a non-transitory processor-readable medium, such as one or more of the computer system memory 54, the node memory 94, and/or the FRM memory 188. The software may be one or more of the software application 58 of the computer system 30, the software application 96 of the network element(s) 14, and/or the FRM software application 189. In one embodiment, the SPCO 200 may be implemented on a shelf controller or node controller such as on the computer system memory 54 and executed by the processor 46 of the computer system 30, may be implemented on the network element 14 (e.g., a ROADM) such as on the node memory 94 and executed by the node processor 90, and/or implemented on an FRM 110 such as on the FRM memory 188 and executed by the FRM processor 186.

In one implementation, when the SPCO 200 is implemented on the FRM 110, e.g., the third FRM 110c, for example, the service components of the SPCO 200 may have one or more defined interactions. For example, the connection manager 224 and the OTSA 204 may interact with an SPCO agent of a management layer (described below in reference to FIG. 7); the OTSA 204 may interact with a neighbor detection protocol executing on the base card; the OCP 208 may interact with a neighbor message handler; and the PCS 212 may interact with the power control agent on either the base or an expansion card (as described below in more detail).

In one implementation, the neighbor discovery protocol, which performs neighbor associate, may be constructed as described in the U.S. patent application Ser. No. 18/152,440 entitled "Systems and Methods for Network Element Neighbor Discovery", filed on Jan. 10, 2022, the entire contents of which are hereby incorporated herein in their entirety. In one implementation, the neighbor message handler is a platform-specific software component operable to exchange messages with adjacent ROADMs (as described below in reference to FIG. 7).

Figure 5:
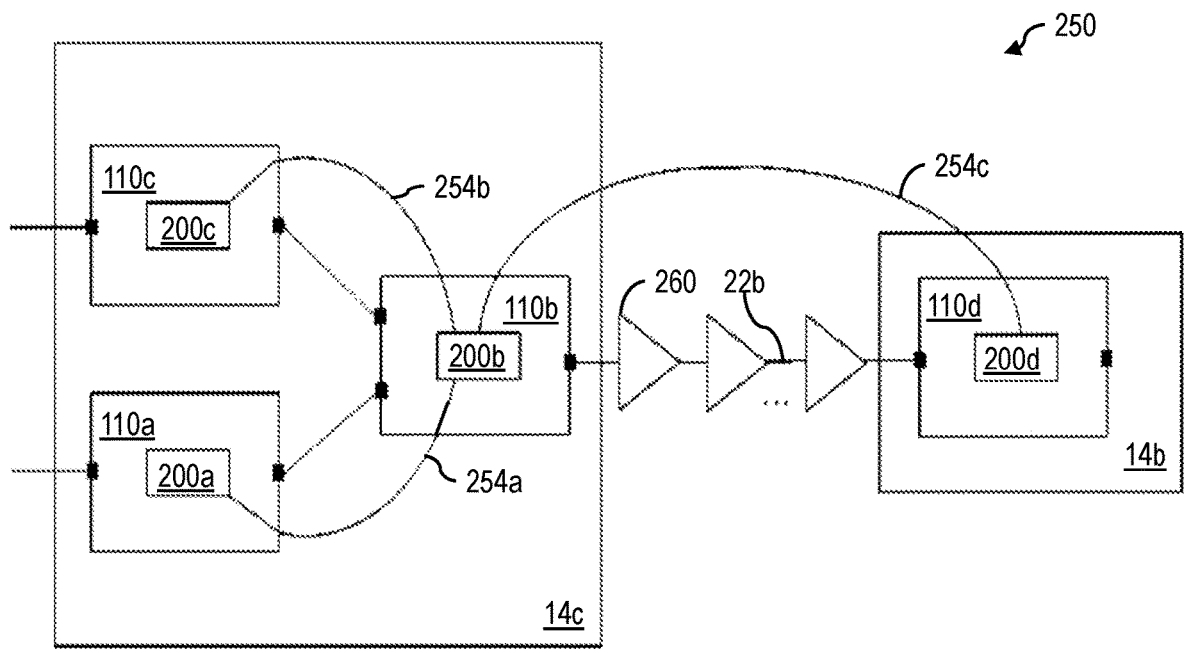
FIG. 5 is a diagram of an exemplary implementation of an adjacency graph of the third network element of FIG. 1 constructed in accordance with the present disclosure.

In one implementation, when the SPCO 200 is deployed on all degrees of a ROADM, e.g., all FRM 110 of a network element 14, the SPCO 200 forms adjacency with neighboring SPCO 200 instances, e.g., a deployed instance of the SPCO 200 on other degrees of a same one of the network element 14 and/or with one or more SPCO 200 deployed on a neighboring network element 14. Referring now to FIG. 5, shown therein is a diagram of an exemplary embodiment of an adjacency graph 250 of the third network element 14c constructed in accordance with the present disclosure.

As shown in FIG. 5, the third network element 14c is optically coupled to the second network element 14b via the second optical fiber link 22b. The third network element 14c includes a first SPCO 200a deployed on the first FRM 110a, a second SPCO 200b deployed on the second FRM 110b, and a third SPCO 200c deployed on the third FRM 110c. The second network element 14b includes a fourth SPCO 200d deployed on a fourth FRM 110d. Further shown in FIG. 5 is one or more in-line optical component 260 optically disposed on the second optical fiber link 22b intermediate the third network element 14c and the second network element 14b. The in-line optical component 260 may be, for example, one or more of an in-line optical amplifier, a variable optical attenuator (VOA), an erbium-doped fiber amplifier (EDFA), and/or the like.

In one implementation, the second SPCO 200b, deployed on the second FRM 110b forms a neighbor association with neighboring SPCO 200 instances. As shown in FIG. 5, the second SPCO 200b forms a first neighbor association 254a with the first SPCO 200a deployed on the first FRM 110a and a second neighbor association 254b with the third SPCO 200c deployed on the third FRM 110c. Each of the first neighbor association 254a and the second neighbor association 254b may be considered an intra-node neighbor association because each of the associated FRM 110 (e.g., the first FRM 110a and the third FRM 110c) are components of the same node as the second FRM 110b, i.e., the third network element 14c. The second SPCO 200b may further form a third neighbor association with the fourth SPCO 200d deployed on the fourth FRM 110d of the second network element 14b. The third neighbor association 254c may be considered an inter-node (or inter-degree) neighbor association because the associated FRM 110 (e.g., the fourth FRM 110d) is a component of a different node from the second FRM 110b, i.e., the fourth FRM 110d is on the second network element 14b while the second FRM 110b is on the third network element 14c. It should be noted that while the third neighbor association 254c is shown between the second SPCO 200b on the second FRM 110b and the fourth SPCO 200d on the fourth FRM 110d, the third neighbor association 254c may be between the second SPCO 200b on the second FRM 110b and an SPCO 200 deployed on a downstream ROADM from the second FRM 110b, such as on the node memory 94 of the second network element 14b and/or on the or the computer system memory 54 associated with the second network element 14b.

As described above, the SPCO 200 and one or more service component of the SPCO 200 may be implemented as software and deployed at any level of the optical transport network 10, e.g., deployed on a chassis or site level in the computer system memory 54, deployed at the node level in the node memory 94, and/or deployed at the FRM or line card level in the FRM memory 188. In order for the SPCO 200 to operate and function at each level without requiring the SPCO 200 to be recompiled for each specific level, functions at each level are abstracted to maintain consistent behavior of the SPCO 200. In this way, the SPCO 200 and all service components of the SPCO 200 use a generic optical topology and switching abstraction to carry out functions, thereby enabling the SPCO 200 to be reusable across different levels and platforms. Because a physical realization of the abstract topology is necessary, i.e., services are actually activated and/or deactivated, mapping between components of the abstract topology and the physical counterparts is established as well.

In this way, communication between distributed deployments of the SPCO 200a-d across multiple network elements 14 in the optical transport network 10 and within each network element 14 across each degree achieves network level orchestration. By deploying the SPCO 200 on each network element 14, dedicated orchestration hardware external to the network element 14 is not needed and may be omitted. Additionally, if a particular SPCO 200 were to fail, orchestration functionality may be maintained by adjacent SPCO 200 instances. In some implementations, within a degree level deployment (e.g., the SPCO 200 being deployed on a particular FRM 110), orchestration functions and associated optical power control blocks are co-located on the same FRM processor 186 thereby providing faster and more reliable local interactions (e.g., interactions between the SPCO 200 and one or more component of the FRM 110). Moreover, fault monitoring, detection, handling, and recovery processes can be sped up as these processes are localized.

Figure 6A:
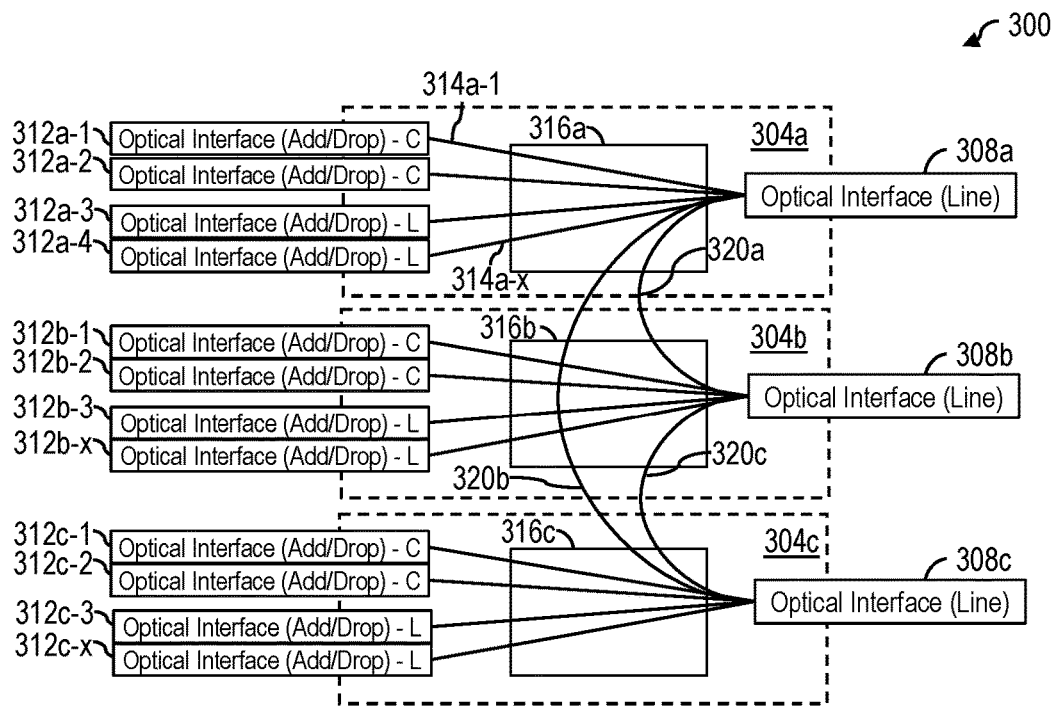
FIG. 6A is a functional diagram of an exemplary implementation of a logical ROADM model constructed in accordance with the present disclosure.

Referring now to FIG. 6A, shown therein is a functional diagram of an exemplary implementation of a logical ROADM model 300 constructed in accordance with the present disclosure. The logical ROADM model 300 shown in FIG. 6A is a logical representation of an 'n'-degree ROADM described below in more detail in FIG. 6B and is described as a three-degree ROADM for brevity and simplicity. As shown, the logical ROADM model 300 generally comprises one or more logical FRM model 304a-n (illustrated as a first logical FRM model 304a, a second logical FRM model 304b, and a third logical FRM model 304c). Each logical FRM model 304 generally comprises a logical line port 308 logically linked to one or more logical system port via a connectivity matrix 316.

As shown in FIG. 6A, the first logical FRM model 304a comprises a first logical line port 308a logically coupled via logical connections 314a-1 through 314a-x (e.g., add/drop connection) to a plurality of system ports 312a-1 through 312a-x via a first connectivity matrix 316a; the second logical FRM model 304b comprises a second logical line port 308b logically coupled to a plurality of system ports 312b-1 through 312b-x via a second connectivity matrix 316b; and the third logical FRM model 304c comprises a third logical line port 308c logically coupled to a plurality of system ports 312c-1 through 312c-x via a third connectivity matrix 316c.

The logical ROADM model 300 represents an Optical Switching Framework (OSF) in which switching is defined between a pair of interfaces, such as a line port and one or more system port. As discussed above, each ROADM consists of one or more degrees/FRMs and each degree/FRM consists of a group of optical interfaces, such as a line port and one or more system port. A connectivity between each optical interface (e.g., the logical line ports 308 and the logical system ports 312) is defined in the connectivity matrix 316.

In one implementation, as discussed above, each system port 194 has a port type of either Add/drop port or express port. When a particular system port 194 has a port type of add/drop port, the particular system port 194 interfaces directly with client signals. The client signals may be either connected directly to the line port or multiplexed in one or more stages into an optical signal supplied to the line port. The optical interface model of the logical system ports 312 of the particular system port 194 subsumes the multiplexing hierarchy associated with the client signals entering the ROADM.

In one implementation, when a particular system port 194 has a port type of express port, the particular system port 194 provides direct express connectivity from one ROADM instance to another, typically co-located within the same site and may be connected via a patch cable when within the same chassis or may be connected via one or more waveguide when within the same node. The optical interface model of the logical system port 312 having an express port port type (not shown) of the particular system port 194 subsumes the direct express connectivity. As shown in FIG. 6A, logical system ports 312 having an express port type are not modeled for inter-degree/inter-node connectivity but are instead shown as a cross-connection 320 (discussed below).

In one implementation, the line port 192 provides for optical communication with a component external to the ROADM such as for optical communication with a ROADM instance located at a different site, e.g., a downstream network element 14. The logical line port 308 is an optical interface model for the line port 192.

Figure 6B:
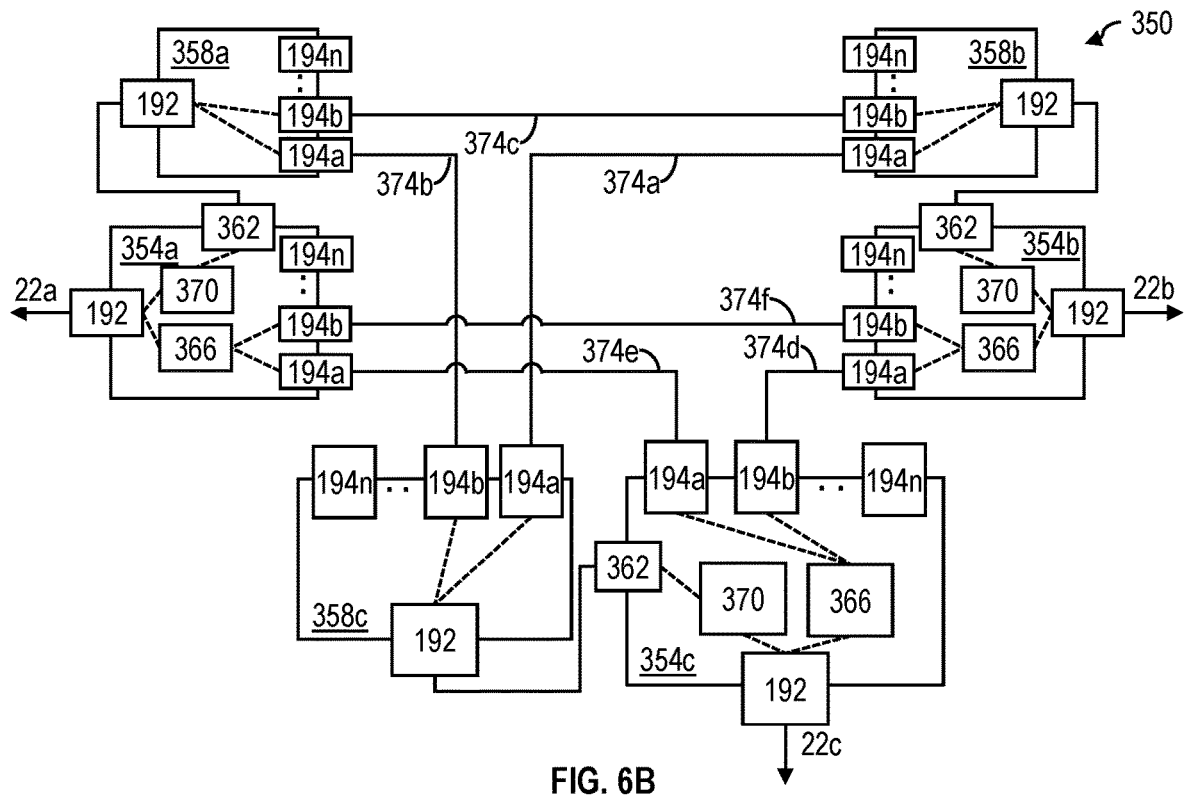
FIG. 6B is a block diagram of another exemplary implementation of a physical topology of a ROADM constructed in accordance with the present disclosure.

In one implementation, each connectivity matrix 315 described connectivity between pairs of optical interfaces, such as the logical line port 308 and one or more logical system port 312. A cross-connection 320 from a first optical interface to a second optical interface may be completed if the cross-connection 320 is defined in the connectivity matrix 316. The cross-connection 320 may define connectivity both between add/drop ports and line ports, and between express ports and line ports 192 when the logical ROADM model 300 includes more than one logical line port 308. For example, as shown in FIG. 6B, a first cross-connection 320a, defined in the first connectivity matrix 316a and the second connectivity matrix 316b as an express connection, is shown between the first logical line port 308a and the second logical line port 308b and a second cross-connection 320b, defined in the first connectivity matrix 316a as an express connection, is shown between the logical system port 312a-1 and the first logical line port 308a.

In one implementation, each cross-connection 320 is unidirectional while the optical connection is bidirectional because a first state of the FRM 110 operating in a first degree is independent of a second state of the FRM 110 operating in a second degree. In this implementation, with the logical ROADM model 300 modeling each cross-connection 320 in a first direction (e.g., from an upstream node to a downstream node), a second logical ROADM model may be created for a second direction opposite the first direction (e.g., from the downstream node to the upstream node).

In one implementation, each optical interface supports one of C-Band, L-Band, or C+L-Band.

In some implementations, only line ports 192 (and thus logical line ports 308) support C+L-Band while system ports 194 (and thus logical system ports 312) support either C-Band or L-Band, but not C+L-Band. In this implementation, separate entries in the connectivity matrix 316 may be defined for C-Band connectivity (i.e., from a C-Band FRM 354, described below) and L-Band connectivity (i.e., from an L-Band FRM 358, described below). For example, a first connectivity entry may be defined in the first connectivity matrix 316a for connectivity of the first logical system port 312a-1 supporting the C-Band, while a second connectivity entry may be defined in the first connectivity matrix 316a for connectivity of the third logical system port 312a-3 supporting the L-Band. In this way, each logical FRM model 304 of the logical ROADM model 300 is a consolidation of functions of the C-Band FRM 354 and the L-Band FRM 358. In one implementation, the C-Band FRM 354 is an FRM-20X-C and the L-Band FRM 358 is an FRM-20X-L.

Referring now to FIG. 6B, shown therein is a block diagram of an exemplary embodiment of a physical topology of a ROADM 350 constructed in accordance with the present disclosure. Generally, the ROADM 350 includes a C-Band FRM 354 and an L-Band FRM 358 for each degree. As shown in exemplary FIG. 6B, the ROADM 350 includes a first L-Band FRM 358a coupled to a first C-Band FRM 354a, and a second L-Band FRM 358b coupled to a second C-Band FRM 354b, and a third L-Band FRM 358c coupled to a third C-Band FRM 354c. The ROADM 350 of FIG. 6B is shown as a three-degree ROADM, however, the ROADM 350 may have more than three degrees or fewer than three degrees.

In one implementation, the first L-Band FRM 358a generally comprises a plurality of system ports 194a-n selectably optically coupled to the line port 192. The line port 192 of the first L-Band FRM 358a is optically coupled to an expansion port 362 of the first C-Band FRM 354a. The first C-Band FRM 354a generally comprises a plurality of system ports 194a-n selectably optically coupled to a C-Band connection termination point (e.g., a C-Band CTP 366) and the expansion port 362 is optically coupled to an L-Band CTP 370. The C-Band CTP 366 and the L-Band CTP 370 are optically combined and coupled to the line port 192 of the first C-Band FRM 354a. The line port 192 of the first C-Band FRM 354a may be coupled to an optical fiber link 22 such as the first optical fiber link 22a, for example. As used here, a connection termination point (or CTP) is a logical connection termination point.

In one implementation, as shown in FIG. 6B, an express connection 374 is formed connecting at least one system port 194 of each L-Band FRM 358 to each other L-Band FRM 358. For example, as shown, a first express connection 374a optically links the first system port 194a of the second L-Band FRM 358b and the first system port 194a of the third L-Band FRM 358c, a second express connection 374b optically links the first system port 194a of the first L-Band FRM 358a and the second system port 194b of the third L-Band FRM 358c, and a third express connection 374c optically links the second system port 194b of the first L-Band FRM 358a and the second system port 194b of the second L-Band FRM 358b.

In one implementation, as shown in FIG. 6B, an express connection 374 is formed connecting at least one system port 194 of each C-Band FRM 354 to each other C-Band FRM 354. For example, as shown, a fourth express connection 374d optically links the first system port 194a of the second C-Band FRM 354b and the second system port 194b of the third C-Band FRM 354c, a fifth express connection 374e optically links the first system port 194a of the first C-Band FRM 354a and the first system port 194a of the third C-Band FRM 354c, and a sixth express connection 374f optically links the second system port 194b of the first C-Band FRM 354a and the second system port 194b of the second C-Band FRM 354b.

In one implementation, the second L-Band FRM 358b and the second C-Band FRM 354b are generally constructed and coupled similar to the first L-Band FRM 358a and the first C-Band FRM 354a as described above. Similarly, the third L-Band FRM 358c and the third C-Band FRM 354c are generally constructed and coupled similar to the first L-Band FRM 358a and the first C-Band FRM 354a as described above.

Referring back to FIG. 6A, in combination with FIG. 6B, in one implementation, each connectivity matrix 316 may be applied to a ROADM 350 to abstract physical ports of the ROADM 350 into logical ports of the logical ROADM model 300. For example, the first connectivity matrix 316a may abstract the line port 192 of the first C-Band FRM 354a, the line port 192 of the third C-Band FRM 354c, the first system port 194a of the first L-Band FRM 358a, the second system port 194b of the third L-Band FRM 358c, the first system port 194a of the first C-Band FRM 354a, and the first system port 194a of the third C-Band FRM 354c into the second cross-connection 320b. Additionally, the first connectivity matrix 316a may abstract the line port 192 of the first C-Band FRM 354a, the line port 192 of the second C-Band FRM 354b, the second system port 194b of the first L-Band FRM 358a, the second system port 194b of the second L-Band FRM 358b, the second system port 194b of the first C-Band FRM 354a, and the second system port 194b of the second C-Band FRM 354b into the first cross-connection 320a.

Similarly, the second connectivity matrix 316b may abstract the line port 192 of the second C-Band FRM 354b, the line port 192 of the third C-Band FRM 354c, the first system port 194a of the second L-Band FRM 358b, the first system port 194a of the third L-Band FRM 358c, the first system port 194a of the second C-Band FRM 354b, and the second system port 194b of the third C-Band FRM 354c into the third cross-connection 320c. Additionally, the second connectivity matrix 316b may abstract the line port 192 of the second C-Band FRM 354b, the line port 192 of the first C-Band FRM 354a, the second system port 194b of the second L-Band FRM 358b, the second system port 194b of the first L-Band FRM 358a, the second system port 194b of the second C-Band FRM 354b, and the second system port 194b of the first C-Band FRM 354a into the first cross-connection 320a.

Further, the third connectivity matrix 316c may abstract the line port 192 of the third C-Band FRM 354c, the line port 192 of the first C-Band FRM 354a, the first system port 194a of the first L-Band FRM 358a, the second system port 194b of the third L-Band FRM 358c, the first system port 194a of the first C-Band FRM 354a, and the first system port 194a of the third C-Band FRM 354c into the second cross-connection 320b. Additionally, the third connectivity matrix 316c may abstract the line port 192 of the second C-Band FRM 354b, the line port 192 of the third C-Band FRM 354c, the first system port 194a of the second L-Band FRM 358b, the first system port 194a of the third L-Band FRM 358c, the first system port 194a of the second C-Band FRM 354b, and the second system port 194b of the third C-Band FRM 354c into the third cross-connection 320c.

Figure 7:
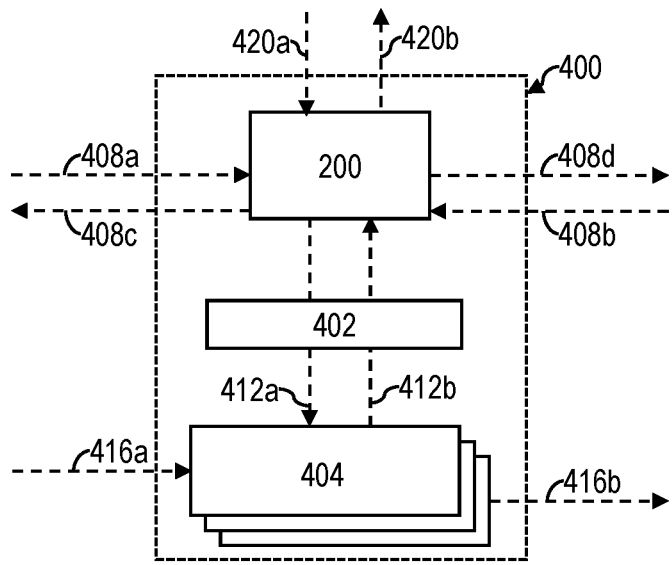
FIG. 7 is a functional model of an exemplary implementation of an optical services and power controls sub-system constructed in accordance with the present disclosure.

Referring now to FIG. 7, shown therein is a functional model of an exemplary implementation of an optical services and power controls sub-system 400 (hereinafter sub-system 400), constructed in accordance with the present disclosure. In some implementations, as shown in FIG. 7, the sub-system 400 is an implementation of the software application 58 of the computer system 30, the software application 96 of the network element(s) 14, and/or the FRM software application 189 described above and operable to perform an action such as communicate with or control one or more component of the computer system 30, the optical transport network 10 (e.g., one or more of the network elements 14) and/or the communication network 34.

In one implementation, the sub-system 400 of FIG. 7 is implemented on a ROADM and comprises the SPCO 200, a power control agent 402 (hereinafter, PCA 402) and one or more control block 404. The one or more control block 404 may be operable to control one or more component of the network element 14 via an optical power control-related configuration of the optical transport network 10 (i.e., by adjusting one or more attenuation level and/or one or more gain associated with the network element 14) such that a target optical power level in the optical fiber link 22 is maintained within a tolerance level of optimal levels all of the time. Maintaining such a target optical power level may have the effect of guaranteeing that receiving equipment (i.e., a light sink 100 of a receiving network element 14) receives a higher-quality signal with a good Signal-to-Noise Ratio (SNR) and with minimal distortion. In one implementation, each of the one or more control block 404 may be associated with one or more component of the ROADM. For example, referring to FIG. 6B, one or more first control block 404 may be associated with the C-Band FRM 354 and one or more second control block 404 may be associated with the L-Band FRM 358. In one implementation, the SPCO 200 deployed on the C-Band FRM 354 can control the L-Band FRM 358 coupled thereto.

In some implementations, the SPCO 200 is operable to control one or more optical power control-related configuration of the network element 14 and/or the control block 404 thereof, via the PCA 402. In one implementation, exemplary components of the network element 14 controlled by one or more control block 404 includes a WSS, an EDFA, an optical channel monitor, a variable optical attenuator, a Raman pump, and other optical devices, for example. In one implementation, the control blocks 404 may be specific to the component of the network element 14 the SPCO 200 is deployed to, and, in some implementations, may be product dependent. For example, optical functions and topology for the network element components are usually modelled as a second level expansion of the logical ROADM model 300 (described below). The optical components are primarily used to carry out optical power control functions on the associated equipment. Additionally, because power control functions are delegated to existing local controls (e.g., input power controls (INPC), MCL and DMCL) and link level optical power controls, the SPCO 200 and/or the orchestrator 202 are not required to model fined grained optical topology; however, the SPCO 200 and/or orchestrator 202 do need to know what optical control blocks are supported in on the platform in which the SPCO 200 is deployed.

Each control block 404 may comprise at least one of a MUX control block 404a operable to control one or more optical power control-related configuration of a MUX WSS, a DEMUX control block 404b operable to control one or more optical power control-related configuration of a DEMUX WSS, and a link control block 404c operable to control one or more link level optical power such as optical power control-related configuration of one or more optical amplifier (OA) and/or variable optical attenuator (VOA) and/or in the optical fiber link 22.

In one implementation, the MUX control block 404a may adjust one or more passband configuration and/or one or more attenuation of the "MUX" WSSs. Such adjustments may be made by the MUX control block 404a on a per-passband basis. In one implementation, the DEMUX control block 404b may adjust one or more passband configuration and/or one or more attenuation of the "DEMUX" WSSs. Such adjustments may be made by the DEMUX control block 404b on a per-passband basis. In some implementations, the functions of the MUX control block 404a and the DEMUX control block 404b may be performed by a single control block 404.

In one implementation, the link control block 404c may adjust one or more configuration, one or more attenuation, and/or one or more gain for one or more in-line optical component 260 (such as the optical amplifier (OA) and/or variable optical attenuator (VOA) in the optical fiber link 22). Such adjustments may be made on a per-band basis (i.e., the C-band, the L-band, or C/L-band).

In one implementation, each control block 404 exposes one or more functionalities, including common functionalities, such as 'sync control block' and 'get status of control block'. Other functionalities may be exposed based on the type of the control block. For example, the MUX control block 404a and the DEMUX control block 404b may expose functionalities including 'activate passband request', 'deactivate passband request", 'block passband request", 'enable adjustment request", 'disable adjustment request", and/or the like. The link control block 404c may expose 'adjust gain request", 'enable gain adjust request", 'disable gain adjust request", 'activate band request", 'deactivate band request", and/or the like. In one implementation, the PCA 402 operates as a standardized (or abstracted) interface for exposing the above functionalities of individual control blocks 404 to the SPCO 200. For example, the PCS 212 may also send update from the PCA (via a notification channel) regarding one or more of a control block state such as a 'state update', 'passband state update', 'band info update', 'link control update', and/or the like.

In some implementations, the SPCO 200 is operable to control one or more optical power control-related configuration of the control blocks 404 via the PCA 402. For example, the SPCO 200 may send one or more PCO request and/or loading request to the PCA 402. Additionally, the SPCO 200 may receive one or more PCO response, loading response, passband state, and/or control block state from the PCA 402. In the case that the SPCO 200 sends a loading request to the PCA 402 (e.g., to activate and/or deactivate a group of passbands), the PCA 402 translates abstracted commands of the loading request to hardware commands for the control blocks 404. The control block 404 may then act on the loading request, perform activation and/or deactivation for a group of passbands, and sends the loading response to the PCA 402, which receives the loading response and converts the loading response to a logical abstraction accessible by the orchestrator 202 and/or SPCO 200, e.g., in conjunction with the OTSA 204. In some implementations, the control block 404 may also send one or more state update for the passbands in the group of passbands, a state of the control block 404 pertaining to power control loop functionality, and/or other supplementary information such as state of one of the one or more bands and/or an optical link state.

In one implementation, the SPCO 200 may be operable to receive and/or send an inter-node communication 408, e.g., to upstream and/or to downstream ROADMS and/or network elements 14. For example, the SPCO 200 may receive a first inter-node communication 408a from an upstream direction, may receive a second inter-node communication 408b from a downstream direction, may send a third inter-node communication 408c in the upstream direction, and may send a fourth inter-node communication 408d in the downstream direction. Such orchestration may have the effect of minimizing the impact the SRS tilt effect has on pre-existing optical services in the optical transport network 10. For example, the SPCO 200 may be operable to receive and/or send the inter-node communication 408 to one or more of an upstream orchestrator application (e.g., an SPCO 200 operating on an upstream network element) or a downstream orchestrator application operating on a downstream network element.

In one implementation, each of the inter-node communications 408 may be one or more of a PCO request 412a, a passband loading state, a PCO response 412b, a passband loading status, and/or a health status update.

In some implementations, the PCA 402 may transmit PCO requests 412a to the control block(s) 404 and may receive PCO responses 412b and/or health status updates from the control block(s) 404. In one implementation, each PCO request 412a originates from an upstream ROADM (e.g., via the first inter-node communication 408a). When the orchestrator 202 of the SPCO 200 receives the PCO request 412a from the first inter-node communication 408a, the SPCO 200 issues the PCO request 412a to the PCA 402 which, in turn, transmits the PCO request 412a to a particular control block 404. The particular control block 404 may act on the PCO request 412a and transmit the PCO response 412b back towards the orchestrator 202. The SPCO 200 may then send a consolidated PCO response back to the upstream ROADM, e.g., via the third inter-node communication 408c. The PCO request 412a may be one or more of a disable adjust request, Mux WSS control adjustment request, adjust link control request, and/or an enable adjustment request.

In one implementation, the PCO request 412a is a disable adjust request issued by an orchestrator deployed on the upstream ROADM to the SPCO 200 to disable automatic WSS and link level optical power controls. The disable adjust request further suspends local loading on all mux degrees. When the SPCO 200 receives the disable adjust request and transmits the disable adjust request to the MUX control block 404a on all dependent mux degrees, the MUX control block 404a stores a reference power level.

In one implementation, the PCO request 412a is a Mux WSS controls adjust request issued by an orchestrator on the upstream ROADM to the SPCO 200 to adjust cause the mux WSS to meet a reference power level in a MUX control block 404a for all dependent express services on all dependent mux degrees.

In one implementation, the PCO request 412a is an adjust link control request issued by an orchestrator on the upstream ROADM to the SPCO 200 to adjust link amplifier controls in a link control block 404c to meet an optical power target on all dependent mux degrees.

In one implementation, the PCO request 412a is an enable adjust request issued by an orchestrator on the upstream ROADM to the SPCO 200 to enable autonomous WSS and link level optical power controls (e.g., suspend optical power adjustments, enable optical power adjustments, etc.) in the MUX control block 404a and the link control block 404c running on all dependent mux modules. Further, it enables loading on all dependent mux degrees.

In one implementation, the PCO request 412a may originate from the orchestrator on the upstream ROADM where passband loading is performed and sent to the SPCO 200 through the OCP 208. The OCP 208, in turn, ensures that the PCO request 412a is sent to the orchestrator 202, which, in turn, sends the PCO request 412a to the control block 404 via the PCA 402. In one implementation, once, the SPCO 200 sends the consolidated PCO response the upstream ROADM, the OCP 208 again ensures that the PCO response 412b is transmitted to the orchestrator on the upstream ROADM.

In one implementation, each control block 404 may send and/or receive controls data 416. For example, the control block 404 may receive upstream controls data 416a from an upstream network element 14 and may transmit downstream controls data 416b to a downstream network element 14. The controls data 416 may include one or more data indicative of one or more of an optical power value, an SNR value, a carrier density, an amplified spontaneous emission (ASE) value, and/or the like.

In one implementation, the SPCO 200 may receive service control requests and/or configuration information 420a from a northbound layer and may transmit service status information 420b to the northbound layer. In some implementations, the northbound layer may be a management layer, for example.

Figure 8:
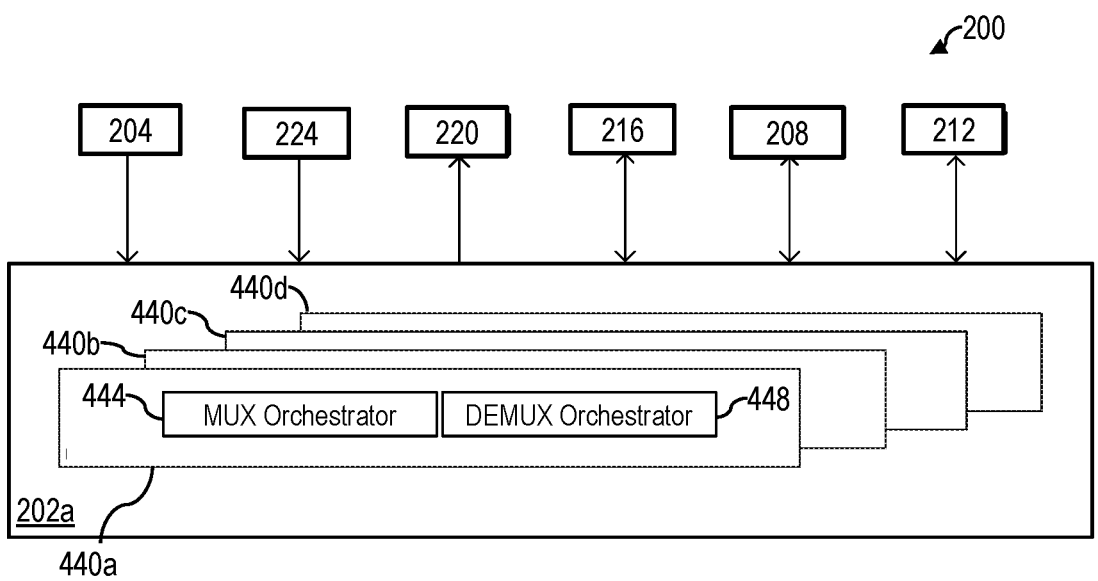
FIG. 8 is a block diagram of an exemplary implementation of an orchestrator implemented on a ROADM with multiple degrees and constructed in accordance with the present disclosure.

Referring now to FIG. 8, shown therein is a block diagram of an exemplary implementation of the SPCO 200 implemented on a ROADM and constructed in accordance with the present disclosure. The SPCO 200 comprises a first orchestrator 202a constructed in accordance with the orchestrator 202 as detailed above and refers to the orchestrator 202 when stored as the software application 96 of the network element 14 and/or the FRM software application 189 in the node memory 94 or the FRM memory 188, and executed by the node processor 90 or the FRM processor 186, respectively. As shown, the first orchestrator 202a is implemented on a ROADM and is composed of and orchestrates activities of one or more degree orchestrator 440a-n (shown as first, second, third, and fourth degree orchestrators 440a through 440d), while each degree orchestrator 440a-d operates independently of each other degree orchestrator 440a-n.

In one implementation, each degree orchestrator 440a-n is constructed in accordance with the orchestrator 202 with the exception that the degree orchestrator 440a-n is in communication with the OTSA 204 to receive the logical FRM model 304 as an FRM abstraction type while the first orchestrator 202a is in communication with the OTSA 204 to receive the logical ROADM model 300 and the logical FRM model 304 for each degree of a ROADM as a ROADM abstraction type. In one implementation, when the first orchestrator 202a is running on an FRM 110, the first orchestrator 202a would include only one degree orchestrator 440. The OTSA 204 reports an abstraction type (e.g., FRM/degree abstraction associated with the logical FRM model or a ROADM abstraction associated with the logical ROADM model) with degree provisioning to the first orchestrator 202a.

In one implementation, each degree orchestrator 440 comprises a MUX orchestrator 444 and a DEMUX orchestrator 448. In one implementation, the MUX orchestrator 444 orchestrates activities of outgoing optical signals, such as ingress to the optical fiber link 22 including any line amplifier controls (e.g., implemented in link level optical power control in link control blocks 404c) and multiplexer WSS controls, such as in MUX control blocks 404a. Conversely, the DEMUX orchestrator 448 orchestrates activities of incoming optical signals, such as ingress to the FRM 110 from the optical fiber link 22 and including any receiver line amplifier controls (e.g., implemented in link level optical power control in link control blocks 404c) and demultiplexer WSS controls such as in DEMUX control blocks 404b.

In one implementation, each of the MUX orchestrator 444 and the DEMUX orchestrator 448 maintain a passband state, e.g., a passband level FSM, with respect to orchestration based at least in part on a passband state in MUX control blocks 404a and DEMUX control blocks 404b. In one implementation, and based on the passband state, each of the MUX orchestrator 444 and the DEMUX orchestrator 448 make loading related decisions and/or delegate loading related decisions to one or more other service component of the SPCO 200.

Figure 9:
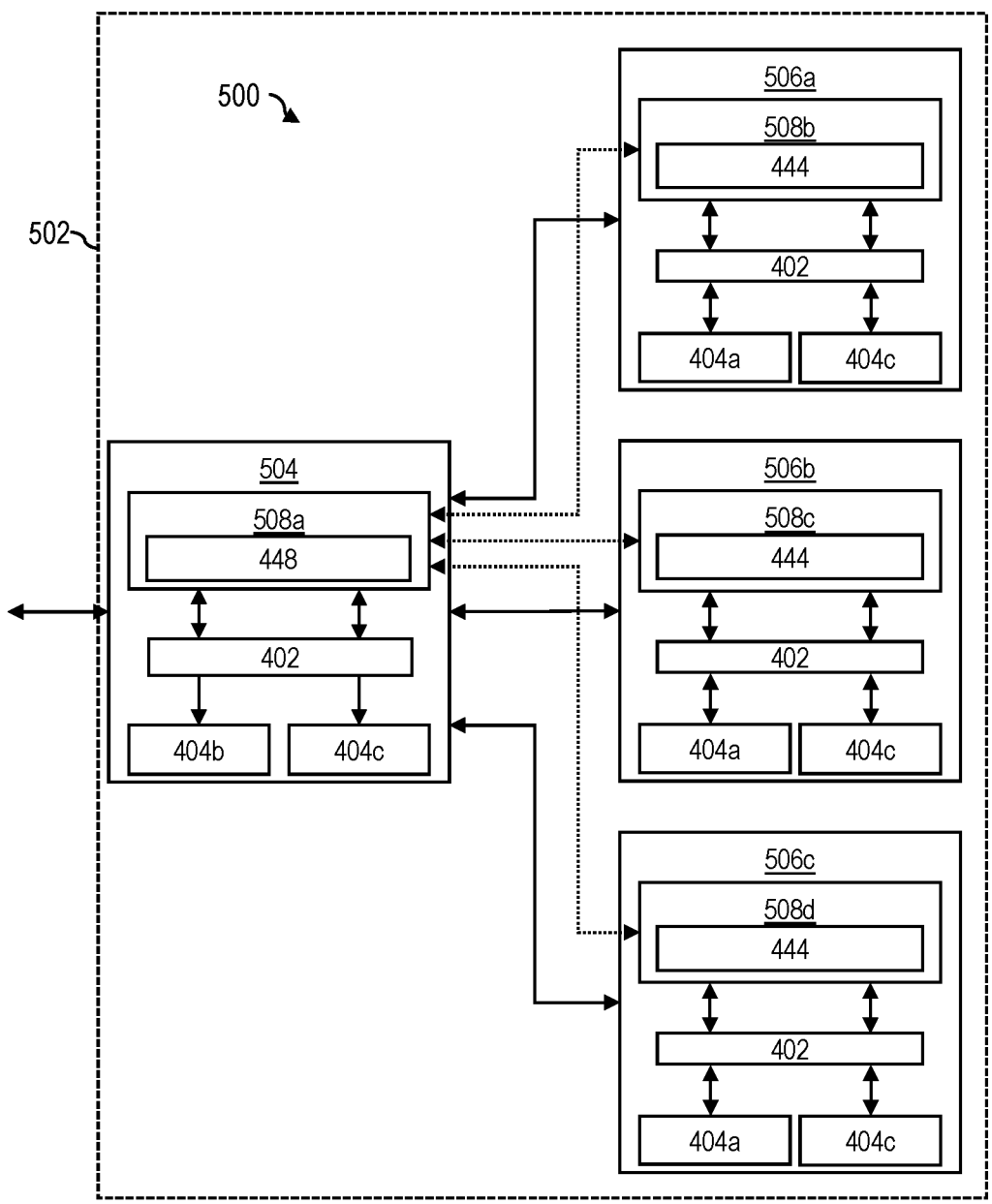
FIG. 9 is a block diagram of an exemplary implementation of an orchestrator network constructed in accordance with the present disclosure.

Referring now to FIG. 9, shown therein is a control diagram of an exemplary implementation of an orchestrator network 500 constructed in accordance with the present disclosure. The orchestrator network 500 deployed within a ROADM 502. The ROADM 502 generally comprises a DEMUX WSS 504 optically coupled to a first MUX WSS 506a, a second MUX WSS 506b, and a third MUX WSS 506c. The DEMUX WSS 504 comprises a first SPCO 508a having the DEMUX orchestrator 448 in communication with the PCA 402. The PCA 402 in the DEMUX WSS 504 is in communication with the DEMUX control block 404b and the link control block 404c in the DEMUX WSS 504. The first MUX WSS 506a comprises a second SPCO 508b having the MUX orchestrator 444 in communication with the PCA 402. The PCA 402 in the first MUX WSS 506a is in communication with the MUX control block 404a and the link control block 404c in the first MUX WSS 506a. The second MUX WSS 506b comprises a third SPCO 508c having the MUX orchestrator 444 in communication with the PCA 402. The PCA 402 in the second MUX WSS 506b is in communication with the MUX control block 404a and the link control block 404c in the second MUX WSS 506b. And, the third MUX WSS 506c comprises a fourth SPCO 508d having the MUX orchestrator 444 in communication with the PCA 402. The PCA 402 in the third MUX WSS 506c is in communication with the MUX control block 404a and the link control block 404c in the third MUX WSS 506c.

The first SPCO 508a, the second SPCO 508b, the third SPCO 508c, and the fourth SPCO 508d may each be constructed in accordance with the SPCO 200 as described above in more detail. Each of the SPCOs 508 may be deployed at an FRM 110 for each degree of the ROADM, that is, for each degree of the ROADM 502, the SPCO 508 may be deployed to the FRM 110 associated with that degree, e.g., the SPCO 508 may be stored in the FRM memory 188 as the FRM software application 189 and executed by the FRM processor 186.

In one implementation, as shown in FIG. 9, the ROADM 502 is an express ROADM such as the third network element 14c with the exception that the ROADM 502 is a four-degree ROADM. Further, the DEMUX WSS 504 may be constructed in accordance with the first WSS 108a of the third network element 14c, the first MUX WSS 506a may be constructed in accordance with the fourth WSS 108d of the third network element 14c, and the second MUX WSS 506b may be constructed in accordance with the sixth WSS 108f of the third network element 14c. Additionally, the third MUX WSS 506c may be constructed in accordance with any of the second WSS 108b, the fourth WSS 108d, and the sixth WSS 108f with the exception that the third MUX WSS 506c is associated with a different degree than that of any of the second WSS 108b, the fourth WSS 108d, and the sixth WSS 108f.

In one implementation, within the DEMUX WSS 504, the DEMUX orchestrator 448, which is part of the first SPCO 508a, works as an overlay over the receive direction (e.g., the demux direction) of the optical controls, that is, the first SPCO 508a works as an overlay over the receive line amplifier controls (e.g., in the link control block 404c in the DEMUX WSS 504) and the DEMUX control block 404b. And, within each MUX WSS 506, the MUX orchestrator 444, which is part of the SPCO 508 in each MUX WSS 506, works as an overlay over the transmit direction (e.g., the mux direction) of the optical controls, that is, the SPCO 508 in each MUX WSS 506, works as an overlay over the transmit line amplifier controls (e.g., link control block 404c) and the MUX control block 404a.

From the above description, it is clear that the inventive concept(s) disclosed herein are well adapted to carry out the objects and to attain the advantages mentioned herein, as well as those inherent in the inventive concept(s) disclosed herein. While the implementation s of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A network element, comprising:
 a processor;
 a first line port optically coupled to a first optical fiber link carrying a first optical signal having a first plurality of passbands;
 a wavelength selective switch in optical communication with the first line port, the wavelength selective switch including a multiplexer, a demultiplexer, and one or more control block, and being operable to selectively switch the first optical signal into a second optical signal having a second plurality of passbands, the one or more control block operable to control one or more of: the multiplexer and the demultiplexer;
 a second line port optically coupled to a second optical fiber link and operable to carry the second optical signal having the second plurality of passbands, the second line port in optical communication with the wavelength selective switch; and
 a memory comprising a non-transitory processor-readable medium storing an orchestrator application, an optical topology and switching abstraction component, one or more service component, and storing processor-executable instructions that when executed by the processor cause the processor to:
  store, by the optical topology and switching abstraction component, a logical ROADM model of the network element, the logical ROADM model having a connectivity matrix associating a cross-connection between a first logical line port associated with the first line port and a second logical line port associated with the second line port;
  receive, by the orchestrator application, a communication from the one or more service component, the communication being associated with the one or more control block based on the logical ROADM model; and
  transmit, to the one or more control block of the wavelength selective switch, one or more service loading sequence based on the logical ROADM model and the communication to cause the wavelength selective switch to control one or more of: the multiplexer via multiplexer WSS controls and the demultiplexer via demultiplexer WSS controls.

2. The network element of claim 1, wherein the one or more service component is an orchestration control protocol, and wherein the memory further stores a loading manager and processor-executable instructions that when executed by the processor further cause the processor to:
 receive, by the orchestrator application, the communication from one or more of an upstream orchestrator application and a downstream orchestrator application, the communication being a passband loading state of the first optical signal received; and
 determine, by the orchestrator application in communication with the loading manager, the one or more service loading sequence based at least in part on the passband loading state of the first optical signal.

3. The network element of claim 2, wherein the memory further stores processor-executable instructions that when executed by the processor further cause the processor to:
 receive, by the orchestrator application, the communication from the one or more service component, the communication further including a power control operation request, the power control operation request being operable to control a particular one of the one or more control block based on either the first logical line port or the second logical line port of the logical ROADM model; and
 determine, by the orchestrator application in communication with the loading manager, the one or more service loading sequence based at least in part on the passband loading state of the first optical signal and the power control operation request associated with the second optical signal.

4. The network element of claim 3, wherein the power control operation request is a disable adjust request from the upstream orchestrator application, wherein each of the first plurality of passbands has a power level, and wherein the memory further stores processor-executable instructions that when executed by the processor further cause the processor to:
 disable loading of the one or more service loading sequence; and
 transmit, by the orchestrator application, the disable adjust request to one or more control block to cause the one or more control block being operable to control the multiplexer WSS controls to suspend optical power adjustments in the wavelength selective switch and store a reference power level for each of the first plurality of passbands in the memory.

5. The network element of claim 4, wherein the power control operation request is an enable adjust request from the upstream orchestrator application, wherein each of the first plurality of passbands has a power level, and wherein the memory further stores processor-executable instructions that when executed by the processor further cause the processor to:
 enable loading of the one or more service loading sequence; and
 transmit, by the orchestrator application, the enable adjust request to one or more control block to cause the one or more control block being operable to control the multiplexer WSS controls to enable optical power adjustments in the wavelength selective switch based at least in part on the reference power level for each of the first plurality of passbands in the memory.

6. The network element of claim 3, wherein the particular one of the one or more control block is a Mux control block, wherein the power control operation request is a Mux WSS controls adjust request, and wherein the memory further stores processor-executable instructions that when executed by the processor further cause the processor to:
 transmit, by the orchestrator application, the Mux WSS controls adjust request to the Mux control block being operable to control the multiplexer WSS controls and cause the wavelength selective switch to meet a reference power level for the second optical signal.

7. The network element of claim 3, wherein the one or more control block is one or more first control block, the power control operation request is a link level optical power controls adjust request from the upstream orchestrator application, wherein one of the first optical fiber link further comprises one or more optical amplifier optically disposed thereon, the one or more optical amplifier having one or more second control block, and wherein the memory further stores processor-executable instructions that when executed by the processor further cause the processor to:
 transmit, by the orchestrator application to the one or more second control block, an adjust link control causing the one or more optical amplifier to meet an optical power target of the second optical signal.

8. The network element of claim 1, wherein the memory further stores processor-executable instructions that when executed by the processor further cause the processor to:
 receive, by the orchestrator application, the communication from the one or more control block of the wavelength selective switch, the communication having a passband loading state of the first optical signal; and
 transmit, by the orchestrator application, the passband loading state of the first optical signal to one or more of an upstream orchestrator application and a downstream orchestrator application.

9. A network element, comprising:
 a first flexible ROADM module comprising:
  a first system port;
  a second system port;
  a first line port optically coupled to a first optical fiber link carrying a first optical signal having a first group of passbands;
  a first processor; and
  a first memory comprising a non-transitory processor-readable medium storing first processor-executable instructions;
 a second flexible ROADM module comprising:
  a third system port;
  a fourth system port;
  a second line port optically coupled to the first flexible ROADM module;
  a second processor; and
  a second memory comprising a non-transitory processor-readable medium storing second processor-executable instructions;
 a node processor; and
 a node memory comprising a non-transitory processor-readable medium storing an orchestrator application, an optical topology and switching abstraction component, and storing processor-executable instructions that when executed by the node processor cause the node processor to:
  store, by the optical topology and switching abstraction component in the node memory, a first logical FRM model of the first flexible ROADM module, the first logical FRM model associating the first system port to a first logical system port, the second system port to a second logical system port, the first line port to a first logical line port, and a first logical connection between the first logical system port and the first logical line port;
  store, by the optical topology and switching abstraction component, a second logical FRM model of the second flexible ROADM module, the second logical FRM model associating the third system port to a third logical system port, the fourth system port to a fourth logical system port, the second line port to a second logical line port, and a second logical connection between the first logical system port and the first logical line port;
  transmit, by the orchestrator application, a first request to the first flexible ROADM module, the first request comprising one of an activation or a deactivation of a first group of passbands of the first optical signal based on a first particular logical system port; and
  transmit, by the orchestrator application, a second request to the second flexible ROADM module, the second request comprising one of an activation or a deactivation of a second group of passbands of the first optical signal based on a second particular logical system port;
 wherein the first processor-executable instructions, when executed by the first processor, cause the first processor to:
  receive, by a first control block, the first request from the orchestrator application; and
  responsive to the first request, activate or deactivate one or more of the first group of passbands based on the first particular logical system port of the first request, each first passband of the first group of passbands being associated with one of the first system port and second system port; and
 wherein the second processor-executable instructions, when executed by the second processor cause the second processor to:
  receive, by a second control block, the second request from the orchestrator application; and
  responsive to the second request, activate or deactivate one or more of the second group of passbands based on the second particular logical system port of the second request, each second passband being associated with one of the third system port and fourth system port.

10. The network element of claim 9, wherein the first flexible ROADM module is a C-Band flexible ROADM module and the second flexible ROADM module is an L-Band flexible ROADM module.

11. The network element of claim 9, wherein the first flexible ROADM module further comprises an expansion port, and wherein the second line port of the second flexible ROADM module is further optically coupled to the first flexible ROADM module via the expansion port.

12. An optical transport network, comprising:
 a first network element comprising a first processor, a first wavelength selective switch having a first line port and a first system port, and a first memory comprising a non-transitory processor-readable medium storing a first orchestrator application and processor-executable instructions that when executed by the first processor cause the first processor to:
  generate, by the first orchestrator application, a request to modify one or more aspect of an optical service; and
  transmit, by the first orchestrator application, the request via the first line port;
 a second network element comprising a second processor, a second wavelength selective switch having a second line port and a second system port and exposing a control block, and a second memory comprising a non-transitory processor-readable medium storing a second orchestrator application, an optical topology and switching abstraction component, a power control sequencer, and processor-executable instructions that when executed by the second processor cause the second processor to:
  store, by the optical topology and switching abstraction component, a logical ROADM model of the second network element, the logical ROADM model being a logical model one or more component of the second network element including the second wavelength selective switch;

receive, by the second orchestrator application, the request to modify one or more aspect of the optical service;

determine, by the second orchestrator application, one or more component of the second network element affected by the request and based on the logical ROADM model;

determine, by the power control sequencer, one or more sequence of optical power control functions to be executed on the second wavelength selective switch, based on the request and the logical ROADM model of the optical topology and switching abstraction component; and transmit the one or more sequence to the control block of the second wavelength selective switch; and an optical fiber link optically coupled to the first line port and the second line port, the optical fiber link operable to carry an optical signal having the optical service in a plurality of passbands.

13. The optical transport network of claim 12, wherein the first memory further stores processor-executable instructions that when executed by the first processor further cause the first processor to:

generate, by the first orchestrator application, a communication including a power control operation request, the power control operation request being operable to control the control block based on either a first logical line port or a second logical line port of the logical ROADM model; and transmit, by the first orchestrator application, the communication to the second orchestrator application of the second network element; and wherein the second memory further stores processor-executable instructions that when executed by the second processor further cause the second processor to:

receive, by the second orchestrator application, the communication including the power control operation request as the request.

14. The optical transport network of claim 13, wherein the optical fiber link further comprises one or more optical amplifier disposed between the first line port and the second line port.

15. The optical transport network of claim 13, wherein the power control operation request is one or more of an enable adjust request, a disable adjust request, a link level optical power controls adjust request, and a Mux WSS controls adjust request.

16. The optical transport network of claim 13, wherein the optical fiber link is a first optical fiber link, the optical signal is a first optical signal, the plurality of passbands is a plurality of first passbands, the second network element further comprising a third wavelength selective switch having a third line port, a third system port, and exposing a link control block, the optical transport network further comprising a second optical fiber link, the second optical fiber link comprising one or more optical amplifier disposed therein, optically coupled to the third line port, and operable to carry a second optical signal having a plurality of second passbands, and wherein the second memory further stores processor-executable instructions that when executed by the second processor further cause the second processor to:

transmit, by the second orchestrator application to the link control block, a link level optical power controls adjust request causing the one or more optical amplifier disposed on the second optical fiber link to meet an optical power target for the second optical signal.

17. The optical transport network of claim 16, wherein the second system port is optically coupled to the third system port, and wherein:

the second wavelength selective switch is operable to optically direct at least one passband of the plurality of first passbands from the first optical signal to the third wavelength selective switch based in part on the power control operation request and the logical ROADM model having a connectivity matrix associating the coupling of the second system port to the third system port as a cross-connection between a first logical system port associated with the second system port and a second logical system port associated with the third system port; and the third wavelength selective switch further exposing a mux control block, the second memory further stores processor-executable instructions that when executed by the second processor further cause the second processor to:

receive, by the second orchestrator application, the communication further including a Mux WSS controls adjust request; and transmit, by the second orchestrator application to the mux control block, the Mux WSS controls adjust request and cause the third wavelength selective switch to meet a reference power level for the second optical signal.

18. The optical transport network of claim 16, further comprising:

a third network element comprising a fourth wavelength selective switch having a fourth line port optically coupled to the second optical fiber link, a third processor, and a third memory comprising a non-transitory processor-readable medium storing a third orchestrator application and processor-executable instructions that when executed by the third processor cause the third processor to:

generate, by the third orchestrator application, a second communication having a second request to modify one or more aspect of the first optical signal, the second request being a particular power control operation request; and transmit, by the third orchestrator application, the second communication via the fourth line port; and wherein the second memory further stores processor-executable instructions that when executed by the second processor further cause the second processor to:

receive, by the second orchestrator application, the second communication having the second request.

19. The optical transport network of claim 18, wherein the second communication is one or more of a second power control operation request, a passband loading status and a health status update.

20. The optical transport network of claim 18, wherein the fourth wavelength selective switch further exposes a demux control block, and wherein the second memory further stores processor-executable instructions that when executed by the second processor further cause the second processor to:

transmit, by the second orchestrator application to third orchestrator application, the second communication having the particular power control operation request; and wherein the third memory further stores processor-executable instructions that when executed by the third processor further cause the third processor to:

receive, by the third orchestrator application, the second communication having the particular power control operation request; and transmit, by the third orchestrator application, the particular power control operation request to the demux control block, wherein the particular power control operation is one or more of an activate passband request, a deactivate passband request, block passband request, an enable adjustment request, and a disable adjustment request.

* * * * *